(12) United States Patent
Farley et al.

(10) Patent No.: US 8,141,157 B2
(45) Date of Patent: Mar. 20, 2012

(54) METHOD AND SYSTEM FOR MANAGING COMPUTER SECURITY INFORMATION

(75) Inventors: Timothy P. Farley, Atlanta, GA (US); John M. Hammer, Norcross, GA (US); Bryan Douglas Williams, Lawrenceville, GA (US); Philip Charles Brass, Roswell, GA (US); George C. Young, Norcross, GA (US); Derek John Mezack, Marietta, GA (US)

(73) Assignee: International Business Machines Corporation, Armonk, NY (US)

( * ) Notice: Subject to any disclaimer, the term of this patent is extended or adjusted under 35 U.S.C. 154(b) by 140 days.

(21) Appl. No.: 12/632,492

(22) Filed: Dec. 7, 2009

(65) Prior Publication Data

US 2010/0083382 A1    Apr. 1, 2010

Related U.S. Application Data

(63) Continuation of application No. 11/432,737, filed on May 11, 2006, now abandoned, which is a continuation of application No. 09/844,447, filed on Apr. 27, 2001, now Pat. No. 7,089,428.

(51) Int. Cl.
*G06F 11/00* (2006.01)
(52) U.S. Cl. .......................................................... 726/24
(58) Field of Classification Search ...................... 726/24
See application file for complete search history.

(56) References Cited

U.S. PATENT DOCUMENTS

| | | | |
|---|---|---|---|
| 5,557,742 | A | 9/1996 | Smaha et al. |
| 6,453,345 | B2 | 9/2002 | Trcka et al. |
| 6,606,744 | B1 | 8/2003 | Mikurak |
| 7,089,428 | B2 | 8/2006 | Farley et al. |
| 7,178,166 | B1 | 2/2007 | Taylor et al. |
| 2002/0078381 | A1 | 6/2002 | Farley et al. |
| 2006/0265746 | A1 | 11/2006 | Farley et al. |

FOREIGN PATENT DOCUMENTS

| | | |
|---|---|---|
| EP | 0985995 A1 | 3/2000 |
| WO | 98/41919 A1 | 9/1998 |
| WO | 99/13427 A2 | 3/1999 |
| WO | 00/10278 A2 | 2/2000 |
| WO | 00/54458 A1 | 9/2000 |

OTHER PUBLICATIONS

Crosbie, Mark et al., "Active Defense of a Computer System Using Autonomous Agents", Coast Group Dept. of Computer Sciences Purdue, 1995, No. 95-008, pp. 1-14 [Pertinent: p. 10, paragraph 7].

(Continued)

*Primary Examiner* — Jacob Lipman
(74) *Attorney, Agent, or Firm* — King & Spalding

(57) ABSTRACT

A security management system includes a fusion engine which "fuses" or assembles information from multiple data sources and analyzes this information in order to detect relationships between raw events that may indicate malicious behavior and to provide an organized presentation of information to consoles without slowing down the processing performed by the data sources. The multiple data sources can comprise sensors or detectors that monitor network traffic or individual computers or both. The sensors can comprise devices that may be used in intrusion detection systems (IDS). The data sources can also comprise firewalls, audit systems, and other like security or IDS devices that monitor data traffic in real-time. The present invention can identify relationships between one or more real-time, raw computer events as they are received in real-time. The fusion engine can also assess and rank the risk of real-time raw events as well as mature correlation events.

27 Claims, 12 Drawing Sheets

OTHER PUBLICATIONS

Munson, John C. et al., "Watcher: The Missing Piece of the Security Puzzle", Computer Security Applications Conferences, 2001, ACSAC 2001, Proceedings 17th Annual Dec. 10-14, 2001, pp. 230-239 [Pertinent paragraphs 5.1-5.7].

Kosoresow, Andrew P. et al., "Intrusion Detection Via System Call Traces", Software, IEEE, vol. 14, Issue 5, Sep.-Oct. 1997, pp. 35-42.

"Understanding Heuristics: Symantec's Bloodhound Technology", Symantec White Paper Series, vol. XXXIV, Sep. 1997, 17 pages.

"Update on Network "Sniffing" Security Vulnerabilities", NASIRC Bulletin #94-10, Mar. 29, 1994, http://csm.nist.gov/secalert/nasa/nasa9410.txt. pp. 1-5.

Non-Final Office Action dated Jun. 29, 2009 for U.S. Appl. No. 11/432,737.

Provisional U.S. Appl. No. 60/200,316, filed Apr. 28, 2000, Inventor Timothy Farley.

Wespi, A.; "Building an Intrusion-Detection System to Detect Suspicious Process Behavior", Proc. of 1999 Int. Symp. on Recent Advances in Intrusion Detection, Sep. 7, 1999, URL: http://www.raid-symposium.org/raid99/PAPERS/Wespi.pdf.

Farley, T.; "Lessons Learned in Commercial IDS Development & Deployment", Proc. of 1999 Int. Symp. on Recent Advances in Intrusion Detection, Sep. 7, 1999, URL, http://www.raid-symposium.org/raid99/PAPERS/Farley.pdf.

Denning, DE; "An Intrusion-Detection Model, Software Engineering", IEEE Transactions on: vol. SE-13, Issue 2, Feb. 1987 pp. 222-232. [Pertinent: pp. 5-14, paragraph V].

Porras, P.A. et al.; "Penetration State Transition Analysis: A Rule-Based Intrusion Detection Approach", Computer Security Applications Conference, 1992, Proceedings, Eighth Annual Nov. 30-Dec. 4, 1992, pp. 220-229. [Pertinent: pp. 222-226 and paragraph 3].

Lindqvist, U. et al.; "eXpert-BSM: A Host-based Intrusion Detection Solution for Sun Solaris", Computer Security Applications Conference, 2001. ASCAC 2001, Proceedings 17th Annual, Dec. 10-14, 2001, pp. 240-251. [Pertinent: pp. 3-6, paragraph 3].

ICE Cap Administrator's Guide Version 1.0 Beta, Network ICE, 1999, Network Ice Corporation. [Pertinent pp. 27-33, paragraph 4].

Denning, P. et al.; "Requirements and Model for IDES Real Time Intrusion Detection Expert System", SRI Project 6169, Final Report, Aug. 1985. [Pertinent pp. 11-12, paragraphs 3.3-3.3.1].

Teng, H.S., et al.; "Adaptive Real-Time Anomaly Detection Using Inductively Generated Sequential Patterns, Research in Security and Privacy", 1990, Proceedings, 1990 IEEE Computer Society Symposium on May 7-9, 1990, pp. 278-284. [Pertinent: p. 279, paragraphs 2-2.1].

Valdes, Al; "Blue Sensors, Sensor Correlation, and Alert Fusion", Oct. 4, 2000., http://www.raid-symposium.org/raid2000/Materials/Abstracts/41/avaldes_raidB.pdf. [Pertinent: Charts 5-8].

NetRanger User's Guide Version 2.1.1, Cisco Systems, Inc., 1998. [Pertinent: pp. 4-62 to 4-95, paragraph 4].

Porras, Phillip, et al.; "Mission-Impact-Based Approach to INFOSEC Alarm Correlation" Lecture Notes in Computer Science, Proceedings Recent Advances in Intrusion Detection, Oct. 2002, pp. 95-114. [Pertinent: 2-8, paragraphs 2-2.4.1].

Bace, Rebecca; "An Introduction to Intrusion Detection & Assessment for System and Network Security Management", Infidel, Inc. for ICSA (White Paper) Apr. 1999. [Pertinent: pp. 23-32].

Bass, Tim; "Multisensor Data Fusion for Next Generation Distributed Intrusion Detection Systems", Proceedings, 1999 IRIS National Symposium on Sensor and Data Fusion, May 1999. [Pertinent: pp. 2-6, paragraphs III-V].

Luckham, David C., et al.; Complex Event Processing in Distributed Systems, Stanford University Technical Report CSL-TR-98-754, Mar. 1998, 28 pages. [Pertinent: pp. 4-8, Paragraph 2].

III, Pettigrew, Andrew; "Information Sharing Projects", IAnewsletter, Summer 1999, vol. 3, No. 1.

Cuppens, Frederic; "Cooperative Intrusion Detection", Onera Centre de Toulouse (funded by the DGA/CASSI). [Pertinent: pp. 5-9, paragraphs 5-7], 2002.

Mukherjee, B., Network Intrusion Detection, IEEE Network Magazine: May/Jun. 1994, vol. 8, Issue: 3, pp. 26-41. [Pertinent: p. 38].

Bass, Tim; "Intrusion Detection Systems and Multisensor Data Fusion", Communications of the ACM, vol. 43, Issued 4 (Apr. 2000), pp. 99-105. [Pertinent: pp. 101-104].

Rationalizing Security Events with Three Dimensions of Correlation, netForensics Inc., 2005, Tech brief, http://www.netforensics.com/download/nF_Comprehensive_Correlation.pdf. [Pertinent: Pages Nos. 1-6].

Metcalf, Therese R.; "Intrusion Detection System Requirements", Mitre Paper. A Capabilities Description in Terms of the Network Monitoring and Assessment Module of CSAP21, Sep. 2000. [Pertinent: Page Nos. 5-8, Paragraph 3].

Jou, Frank Y., et al.; "Architecture Design of a Scalable Intrusion Detection System for the Emerging Network Infrastructure", DARPA, Order No. E296, Apr. 1997, http://citeseer.ist.psu.edu/jou97architecture.html. [Pertinent: p. 19, paragraphs 4.3.3.1.1].

Non-Final Office Action dated Nov. 19, 2004 for U.S. Appl. No. 09/844,447.

Notice of Allowance dated May 19, 2005 for U.S. Appl. No. 09/844,447.

Non-Final Office Action dated Nov. 8, 2005 for U.S. Appl. No. 09/844,447.

Notice of Allowance dated Apr. 6, 2006 for U.S. Appl. No. 09/844,447.

METHOD AND SYSTEM FOR MANAGING COMPUTER SECURITY INFORMATION

PRIORITY AND RELATED APPLICATIONS

The present application is a continuation of and claims priority under 35 U.S.C. §120 to U.S. application Ser. No. 11/432,737 filed May 11, 2006 now abandoned, entitled "Method and System for Managing Computer Security Information," which is a continuation of and claims priority under 35 U.S.C. §120 to U.S. application Ser. No. 09/844,447 filed Apr. 27, 2001, entitled "Method and System for Managing Computer Security Information," which issued as U.S. Pat. No. 7,089,428, the entire contents of which are incorporated by reference.

TECHNICAL FIELD

The present invention relates to computer systems and the security of such systems. More particularly, the present invention relates to a method and system for ranking individual security events according to risk and fusing or identifying relationships between two or more security events that may occur on or within a computer system. The invention can also identify relationships in other security related information.

BACKGROUND OF THE INVENTION

The nature of a distributed network, such as the internet, makes it vulnerable to attack. The internet was designed to allow for the freest possible exchange of information, data, and files. However, this free exchange of information carries a price: many users will try to attack the networks and computers connected to the internet; many users will also try to invade other users' privacy and attempt to crack databases of sensitive information or intercept information as it travels across internet routes.

To detect or prevent such computer attacks, intrusion detection systems (IDS) and software programs that gather information and make changes to security configurations of network computers have been developed. However, these conventional intrusion detection systems can typically have many problems and drawbacks. Conventional intrusion detection systems typically comprise hardware that is dedicated to intrusion detection on networks. Other intrusion detection systems can simply comprise programs running on a host computer.

The problems and drawbacks of many conventional intrusion detection systems can be attributed to at least two parameters that are part of any detection design: The first parameter is the speed in which a detector of an intrusion detection system must run in order to be transparent to the data or communication that flows through the detector. Detectors that typically run on dedicated personal computers must be able to handle constantly increasing loads of information traffic, as network speeds increase from 100 megabits per second to gigabit per second speed and beyond. Because of these high speeds, a detector of an intrusion detection system cannot perform complex analysis of the information that flows through the detector for obvious reasons. That is, if a detector were to perform complex analysis of the information flowing through it, then such analysis would fail to keep up with the flow of information that passes through the detector.

A second key parameter that is part of any detection design is typically the volume of information that may pass through a detector. Because of the high speed at which information passes through a detector, a detector must be able to analyze high volumes of data packets.

In light of current network speeds and the corresponding volume of information that is generated as a result of the network speeds, many detectors of conventional intrusion detection systems can provide very limited protection against complex and more sophisticated computer attacks. This limited protection can manifest itself when many false positives are generated by an intrusion detection system. In other words, many conventional intrusion detection systems may generate false alarms based on communications between computers that do not comprise any threat or attacks.

In addition to false alarms, conventional intrusion detection systems are typically not equipped to handle complex analysis because of the limitations on current processing speeds. For example, many conventional intrusion detection systems cannot execute central processing unit-intensive checks such as the well-known L0pht Crack. The L0pht Crack decode can use cryptographic challenge-response data from Windows (SMB) connections to crack passwords in use on a network. The conventional method for executing L0pht Crack is to obtain packets using a packet-capturing tool and then crack the passwords offline. Conventional intrusion detection system typically cannot employ the L0pht Crack method in any real-time analysis.

Another obstacle of conventional intrusion detection systems is that most intrusion detection systems have very limited or short term memory capacity. In other words, long histories of data streams are seldom kept by the detectors in conventional intrusion detection systems.

Another problem of conventional intrusion detection systems is that the detectors of such systems typically only watch or observe a single environment. For example, detectors usually observe only parts of networks. Conventional detectors typically have a limited scope of awareness since they are designed to observe only portions of a network instead of the entire network as a whole. Because conventional detectors typically monitor only portions of a network, they are unable to track more sophisticated computer attacks such as distributed attacks.

In addition to the inability to track more sophisticated computer attacks, many conventional intrusion detection systems do not permit active probing of an attacker or the target of a computer attack. Active probing typically involves making a determination to see whether a computer attack has had an effect on its target. Further, probing can also comprise methods for discovering additional information about an attacker. However, as mentioned above, most intrusion detection systems do not permit active probing since such probing could reveal the location of the detector. And if the location of a detector is revealed, it sometimes may also become a target for a computer attack.

Accordingly, there is a need in the art for a method and system for managing security information for an entire network. That is, there is a need in the art to log, investigate, respond to, and track computer security incidents that may occur in a network computer system. There is also a need in the art to determine whether security within a network or over a network has been compromised or if an incident is just some odd behavior that should be disregarded by an intrusion detection system. Another need exists in the art for a method and system that can monitor and analyze security information from multiple data sources so that rather complex and sophisticated computer attacks can be identified, stopped, or prevented. A further need exists in the art for a method and system for managing security information in real-time.

Another need exists in the art for a method and system for managing security information such that it can be determined if one or more real-time computer events are related to each other and if they are a part of a larger scheme or sophisticated attack. An additional need exists in the art for a method and system for managing security information where multiple computer events can be correlated together if the computer events are part of a larger scheme or attack. Another need exists in the art for a method and system for managing security information where computer events that are detected can be prioritized so that attention can be focused on those computer events which could cause the most damage to a network or individual computers. Similarly, another need exists in the art for a method and system for managing security information that enables rapid response to existing computer attacks in addition to prevention of the additional computer attacks which may spin off from or be generated from a single computer attack. A further need exists in the art for a method and system for managing security information such that real-time computer events can be classified and ranked according to their respective priorities in the context of the environment in which the event occurred.

SUMMARY OF THE INVENTION

The present invention can solve the aforementioned problems by providing a computer security management system that can log, investigate, respond to, and track computer security incidents that can occur in a networked computer system. The invention can track suspicious computer activity or actual computer security threats. Actual security threats can include, but are not limited to, integrity attacks, confidentiality attacks, denial of service attacks, multi-stage attacks, or other similar attacks on computers or computer networks. The invention typically refers to suspicious computer activity descriptions obtained from data sources as real-time raw events and actual computer security threats as mature correlation events. The invention can comprise a method and system for managing security information collected from one or more data sources. More specifically, the present invention can comprise a fusion engine which "fuses" or assembles information from multiple data sources and analyzes this information in order to detect relationships between raw events that may indicate malicious behavior and to provide an organized presentation of information to one or more consoles without slowing down the processing performed by the data sources.

The multiple data sources can comprise sensors or detectors that monitor network traffic or individual computers or both. The sensors can comprise devices that may be referred to as intrusion detection systems (IDS). Because the present invention can be separate from IDS devices, it permits the IDS devices to operate efficiently and at high speeds when real-time processing of high volumes of data traffic is essential.

The data sources can also comprise firewalls and other like security or IDS devices. Further, the data sources can comprise any devices that may or may not provide real-time information, such as audit systems, that provide additional environmental information about a network or computer of interest. For example, one data source could comprise a database. The database may include a raw event classification database that contains categories of different types of raw events. Another database can comprise a context or knowledge database that includes network context information, such as host vulnerability statuses, historical computer event frequency values, and network zone definitions.

From the multiple data sources, the fusion engine of the present invention can correlate and classify real-time, raw computer events. That is, unlike the conventional art which usually processes computer events after some period of time, the present invention can identify relationships between one or more real-time, raw computer events as they are received in real-time. Real-time raw computer events or raw events may comprise any computer activity that may be tracked by an intrusion detection system as a possible attack on a computer or a plurality of computers. Raw events can be generated by detectors of intrusion detection systems. Each raw event may comprise various parameters that may include, but are not limited to the following: source internet protocol address of the computer activity, destination internet protocol address of the computer activity, priority status assigned by the detector, a vulnerability status assigned by the detector, a time stamp, and an event type parameter.

The fusion engine can determine if one or more real-time raw events are related to each other and if they are part of a larger scheme or computer attack. Real-time raw events that are related to each other and that may indicate that a computer attack may be occurring are referred to by the fusion engine as a mature correlation event. A correlation event can comprise one or more raw events. However, a correlation event does not mean an actual security threat or attack has been detected. Correlation events typically store related raw events and usually indicate that a security event or computer attack has occurred when the correlation event is deemed to be mature. In order to be deemed mature, a correlation event must satisfy the criteria or algorithm of a corresponding correlation rule. Therefore, it is possible to track numerous correlation events that may comprise one or more raw events that have not yet been identified as being a mature correlation event or actual computer security threat or computer attack.

The fusion engine can also assess and rank the risk of real-time raw events as well as mature correlation events base on information about the environment or context in which the event occurred. The fusion engine can display this risk and rank information as messages on a console. The fusion engine can generate and send updates related to mature correlation events to a console. Further, the fusion engine can determine and indicate when a mature correlation event has stopped occurring.

In order to assess risks and determine ranks of real-time raw events, the fusion engine can utilize the aforementioned raw event classification database and the knowledge database. The raw event classification database can permit the fusion engine to classify raw computer events while the knowledge database can permit the fusion engine to rank and evaluate the risk of a raw computer event based upon the context of the raw computer event. The raw event classification database can comprise one or more tables of security information. That is, the raw event classification database can comprise tables that include information that can categorize raw events based on their impact on the target host (confidentiality, integrity, or availability), their scope (network, host, or service), and the method they employ (backdooring, IDS evasion or detection evasion, etc.). The context of the raw computer event can be determined by comparing parameters of the raw event with context parameters in a context or knowledge database, such as the aforementioned event vulnerability statuses, historical computer event frequency values, and zone definitions.

To determine if one or more raw computer events are part of or form a mature correlation event, the fusion engine can apply one or more rules that can be triggered based upon how the fusion engine classifies a raw computer event. In other words, the rules applied by the fusion engine can be activated and applied to raw computer events according to the classification (identification of the type or kind) of the raw events.

In addition to determining whether raw computer events are part of or form a mature correlation event or actual security threat, the fusion engine can also manage its high speed memory resources very efficiently. For example, the fusion engine can employ memory management techniques that erase raw events, immature, and mature correlation events that have either exceeded a predetermined time period or that have met predetermined conditions or both. The high speed memory resources can comprise RAM containing data that is categorized according to the classifications of the raw events and mature correlation events.

DETAILED DESCRIPTION OF EXEMPLARY EMBODIMENTS

Figure 1:
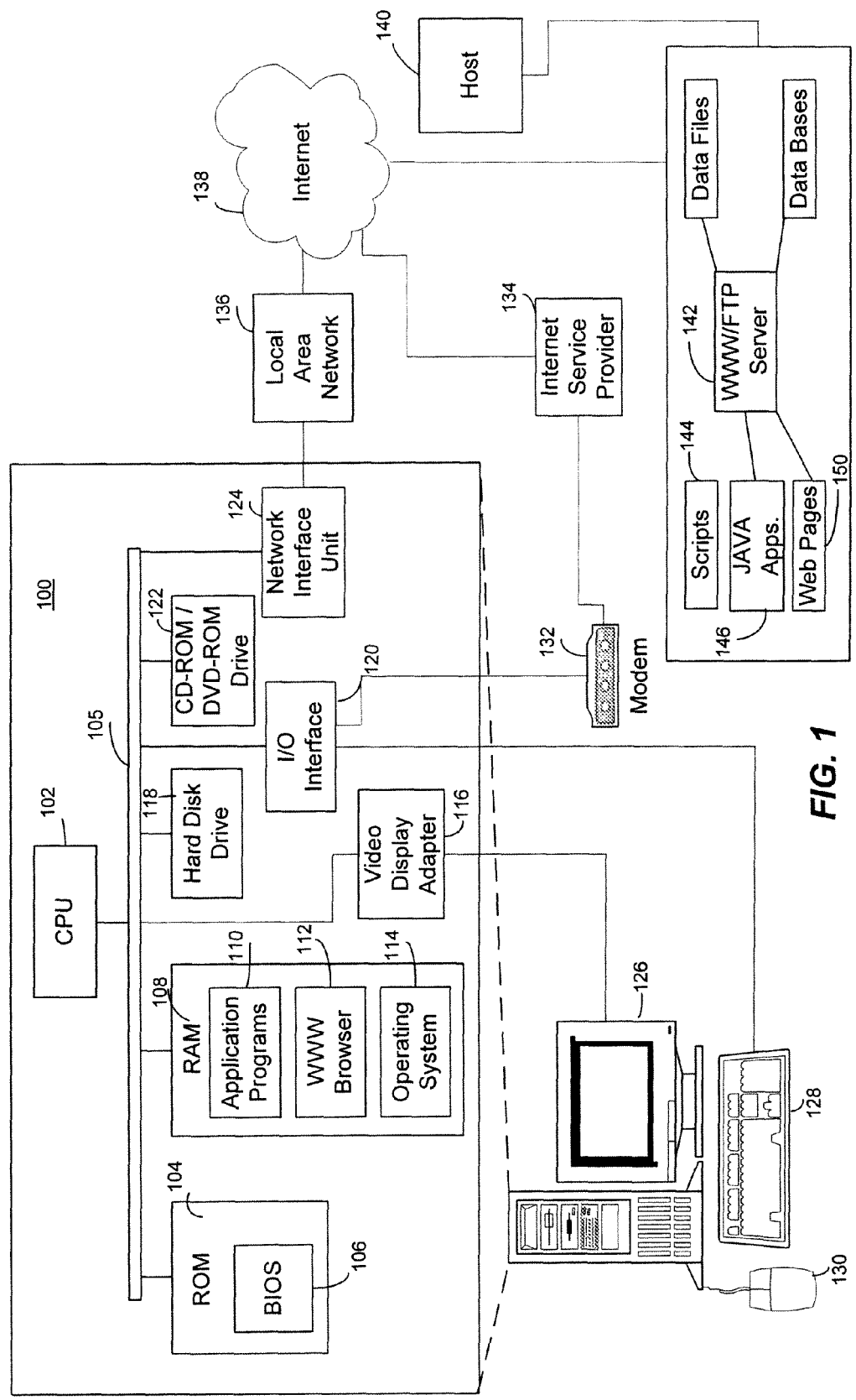
FIG. 1 is a block diagram of a network personal computer that provides the exemplary operating environment for the present invention.

The present invention may be embodied in program modules that run in a distributed computing environment. The present invention can comprise a computer security management system that can log, investigate, respond, and track computer security incidents that can occur in a network computer system. The present invention can comprise a fusion engine which "fuses" or assembles information from multiple data sources and analyzes this information in order to provide an organized, and sometimes ranked, presentation of information to one or more consoles. The fusion engine can classify raw real-time computer events while also ranking the real-time computer events based upon comparisons with one or more databases.

Illustrative Operating Environment

Although the illustrative embodiment will be generally described in the context of an program modules running on a personal computer and a server, those skilled in the art will recognize that the present invention may be implemented in conjunction with operating system programs or with other types of program modules for other types of computers. Furthermore, those skilled in the art will recognize that the present invention may be implemented in either a stand-alone or in a distributed computing environment or both. In a distributed computing environment, program modules may be physically located in different local and remote memory storage devices. Execution of the program modules may occur locally in a stand-alone manner or remotely in a client server manner. Examples of such distributed computing environments include local area networks and the Internet.

The detailed description that follows is represented largely in terms of processes and symbolic representations of operations by conventional computer components, including a processing unit (a processor), memory storage devices, connected display devices, and input devices. Furthermore, these processes and operations may utilize conventional computer components in a heterogeneous distributed computing environment, including remote file servers, computer servers, and memory storage devices. Each of these conventional distributed computing components is accessible by the processor via a communication network.

The processes and operations performed by the computer include the manipulation of signals by a processor and the maintenance of these signals within data structures resident in one or more memory storage devices. For the purposes of this discussion, a process is generally conceived to be a sequence of computer-executed steps leading to a desired result. These steps usually require physical manipulations of physical quantities. Usually, though not necessarily, these quantities take the form of electrical, magnetic, or optical signals capable of being stored, transferred, combined, compared, or otherwise manipulated. It is convention for those skilled in the art to refer to representations of these signals as bits, bytes, words, information, elements, symbols, characters, numbers, points, data, entries, objects, images, files, or the like. It should be kept in mind, however, that these and similar terms are associated with appropriate physical quantities for computer operations, and that these terms are merely conventional labels applied to physical quantities that exist within and during operation of the computer.

It should also be understood that manipulations within the computer are often referred to in terms such as creating, adding, calculating, comparing, moving, receiving, determining, identifying, populating, loading, executing, etc. that are often associated with manual operations performed by a human operator. The operations described herein can be machine operations performed in conjunction with various input provided by a human operator or user that interacts with the computer.

In addition, it should be understood that the programs, processes, methods, etc. described herein are not related or limited to any particular computer or apparatus. Rather, various types of general purpose machines may be used with the program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read-only memory.

Referring now to the drawings, in which like numerals represent like elements throughout the several Figures, aspects of the present invention and the illustrative operating environment will be described.

FIG. 1 and the following discussion are intended to provide a brief, general description of a suitable computing environment in which the invention may be implemented. Referring now to FIG. 1, an illustrative environment for implementing the invention includes a conventional personal computer 100, including a processing unit 102, a system memory, including read only memory (ROM) 104 and random access memory (RAM) 108, and a system bus 105 that couples the system memory to the processing unit 102. The read only memory (ROM) 104 includes a basic input/output system 106 (BIOS), containing the basic routines that help to transfer information between elements within the personal computer 100, such as during start-up. The personal computer 100 further includes a hard disk drive 118 and an optical disk drive 122, e.g., for reading a CD-ROM disk or DVD disk, or to read from or write to other optical media. The drives and their associated computer-readable media provide nonvolatile storage for the personal computer 100. Although the description of computer-readable media above refers to a hard disk, a removable magnetic disk and a CD-ROM or DVD-ROM disk, it should be appreciated by those skilled in the art that other types of media are readable by a computer, such as magnetic cassettes, flash memory cards, digital video disks, Bernoulli cartridges, and the like, may also be used in the illustrative operating environment.

A number of program modules may be stored in the drives and RAM 108, including an operating system 114 and one or more application programs 110, such as a program for browsing the world-wide-web, such as WWW browser 112. Such program modules may be stored on hard disk drive 118 and loaded into RAM 108 either partially or fully for execution.

A user may enter commands and information into the personal computer 100 through a keyboard 128 and pointing device, such as a mouse 130. Other control input devices (not shown) may include a microphone, joystick, game pad, satellite dish, scanner, or the like. These and other input devices are often connected to the processing unit 102 through an input/output interface 120 that is coupled to the system bus, but may be connected by other interfaces, such as a game port, universal serial bus, or firewire port. A display monitor 126 or other type of display device is also connected to the system bus 105 via an interface, such as a video display adapter 116. In addition to the monitor, personal computers typically include other peripheral output devices (not shown), such as speakers or printers. The personal computer 100 may be capable of displaying a graphical user interface on monitor 126.

The personal computer 100 may operate in a networked environment using logical connections to one or more remote computers, such as a host computer 140. The host computer 140 may be a server, a router, a peer device or other common network node, and typically includes many or all of the elements described relative to the personal computer 100. The LAN 136 may be further connected to an internet service provider 134 ("ISP") for access to the Internet 138. In this manner, WWW browser 112 may connect to host computer 140 through LAN 136, ISP 134, and the Internet 138. Such networking environments are commonplace in offices, enterprise-wide computer networks, intranets and the Internet.

When used in a LAN networking environment, the personal computer 100 is connected to the LAN 136 through a network interface unit 124. When used in a WAN networking environment, the personal computer 100 typically includes a modem 132 or other means for establishing communications through the internet service provider 134 to the Internet. The modem 132, which may be internal or external, is connected to the system bus 105 via the input/output interface 120. It will be appreciated that the network connections shown are illustrative and other means of establishing a communications link between the computers may be used.

The operating system 114 generally controls the operation of the previously discussed personal computer 100, including input/output operations. In the illustrative operating environment, the invention is used in conjunction with Microsoft Corporation's "Windows NT" operating system and a WWW browser 112. However, it should be understood that the invention can be implemented for use in other operating systems, such as Microsoft Corporation's "WINDOWS 3.1," "WINDOWS 95", "WINDOWS 98" and "WINDOWS 2000" operating systems, IBM Corporation's "OS/2" and "AIX "operating system, SunSoft's "SOLARIS" operating system used in workstations manufactured by Sun Microsystems, and the operating systems used in "MACINTOSH" computers manufactured by Apple Computer, Inc. Likewise, the invention may be implemented for use with other WWW browsers known to those skilled in the art.

Host computer 140 is also connected to the Internet 138, and may contain components similar to those contained in personal computer 100 described above. Additionally, host computer 140 may execute an application program for receiving requests for WWW pages, and for serving such pages to the requestor, such as WWW server 142. WWW server 142 may receive requests for WWW pages 150 or other documents from WWW browser 112. In response to these requests, WWW server 142 may transmit WWW pages 150 comprising hyper-text markup language ("HTML") or other markup language files, such as eXetnsible Markup Language (XML), to WWW browser 112. Likewise, WWW server 142 may also transmit requested data files 148, such as graphical images or text information, to WWW browser 112. WWW server 142 may also execute scripts 144, such as CGI, PERL, ASP, or JSP (Java Server Pages) scripts, to dynamically produce WWW pages 150 for transmission to WWW browser 112. WWW server 142 may also transmit scripts 144, such as a script written in JavaScript, to WWW browser 112 for execution.

Similarly, WWW server 142 may transmit programs written in the Java programming language, developed by Sun Microsystems, Inc., to WWW browser 112 for execution. The WWW server 142 could comprise a UNIX platform running Apache or Netscape webserver. Alternatively, the WWW server 142 could comprise an Internet Information Server (IIS). The present invention is not limited to these enumerated examples. Other web server environments are not beyond the scope of the present invention.

As will be described in more detail below, aspects of the present invention may be embodied in application programs executed by host computer 142, such as scripts 144, or may be embodied in application programs executed by computer 100, such as Java applications 146. Those skilled in the art will also appreciate that aspects of the invention may also be embodied in a stand-alone application program.

Exemplary Computer Architecture

Figure 2:
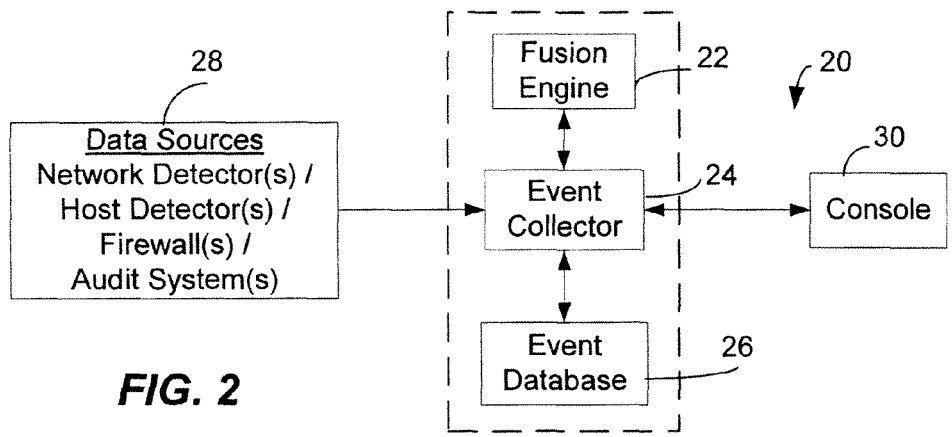
FIG. 2 is a functional block diagram illustrating exemplary network architecture for the present invention.

Referring now to FIG. 2, the computer architecture for one exemplary embodiment of the present invention will be described. FIG. 2 illustrates the System 20 for managing security information collected from one or more data sources. The security system 20 can comprise a fusion engine 22 that is linked to an event collector 24. The event collector 24 can comprise an event sink or device that can organize events received from multiple data sources in a logical manner. Further details of the event collector 24 are described in a related application entitled, "System and Method for Managing Security Events on a Network," filed on Apr. 27, 2001 and assigned U.S. application Ser. No. 09/844,448, the contents of which is hereby incorporated by reference.

The security management system 20 can further comprise an event database 26 that is also linked to the event collector 24. The security management system can also comprise data sources 28 that are linked to the event collector 24 and a console 30 which is also linked to event collector 24. Information from the databases are typically loaded into fusion engine 22 that comprises high-speed memory devices such as random access memory (RAM) since comparisons between raw events and the databases must be performed in a very rapid and in a very efficient manner. Most memory resources used in the fusion engine 22 comprise high-speed memory devices such as RAM (sometimes referred to as "caches" hereinbelow). However, other memory resources are not beyond the scope of the present invention. The memory resources of the fusion engine 22 should be designed to handle high volumes of information with increased speed.

The one or more data sources 28 can comprise many different hardware and software devices. For example, a data source 28 can comprise a network detector or a host detector. Similarly, a data source 28 could also comprise a firewall or an audit system. The present invention is not limited to the types of data sources illustrated. The function of a data source 28 is to provide the event collector 24 with various types of information as it may relate to the network, host, or single computer being monitored by the security management system 20. Other like data sources 28 are not beyond the scope of the present invention. One data source 28 can comprise a host detector which monitors network traffic in the form of data packets. Another data source 28 could comprise observations made by users who are monitoring any network or computer activity.

The one or more data sources 28 forward their information to the event collector 24. The event collector 24 may comprise one or more program modules designed to store and collect the data received from the one or more data sources 28. The event collector 24 can arrange the data and store it in the event database 26. The event collector 24 also forwards any information received from the data sources 28 to the fusion engine 22. The detectors 28 of intrusion detection systems scan raw network traffic or local system events for predefined patterns. Once the detectors identify these predefined patterns of information, the detectors generate a raw event which is then sent to the event collector and later to the fusion engine 22. The fusion engine assembles or "fuses" the raw events or information received from the event collector 24. In other words, the fusion engine 22 organizes and analyzes the information received from the one or more data sources 28 in order to provide an organized presentation of information by correlating (identifying relationships between) raw computer events that are related to each other.

Once the fusion engine 22 determines that two or more events are related to each other (to form a "correlation" event), the fusion engine 22 generates messages and forwards these messages to the event collector 24. The event collector 24, in turn, forwards the messages generated by the fusion engine 22 to a console 30.

Console 30 may comprise a program module that runs on a separate personal computer. The fusion engine 22 may comprise one or more program modules running on a personal computer. The fusion engine 22, the event collector 24, and the event database 26 have been circumscribed by a box 32 to demonstrate that each of these software components can reside on a single computer. However, the present invention is not limited to this configuration. And therefore, the fusion engine 22, the event collector 24, and the event database 26 could also reside on separate computer devices. Other combinations of the software components illustrated could be implemented. That is, the fusion engine 22 and event collector 24 could reside on one hardware device while the event database 26 resides on another hardware device. Conversely, the event collector 24 and event database 26 could reside on one hardware device while the fusion engine 22 resides on another hardware device. Those skilled in the art will appreciate that disclosed software architecture is not limited to the architecture illustrated in the drawings.

Figure 3:
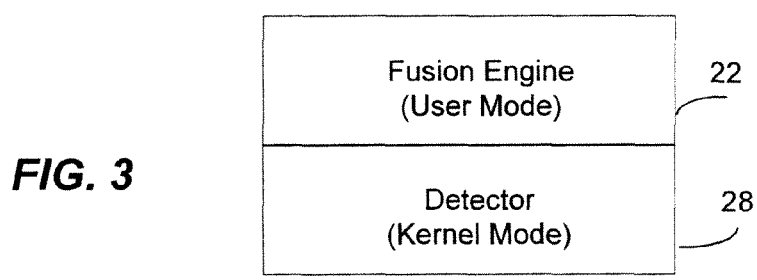
FIG. 3 is a functional block diagram illustrating an exemplary software architecture for the present invention.

Referring now to FIG. 3, a functional block diagram illustrating another exemplary software architecture for the present invention is illustrated. In FIG. 3, the fusion engine program module 22 and a data source such as a detector module 28 could reside in a single machine. That is, the high speed IDS functions of the detector 28 could reside near the kernel of a computer while the fusion engine 22 could reside in the user mode part of the computer. In this way, the additional processing of the fusion engine 22 would not slow down the high speed intrusion detection system functions performed by the detector 24.

Figure 4:
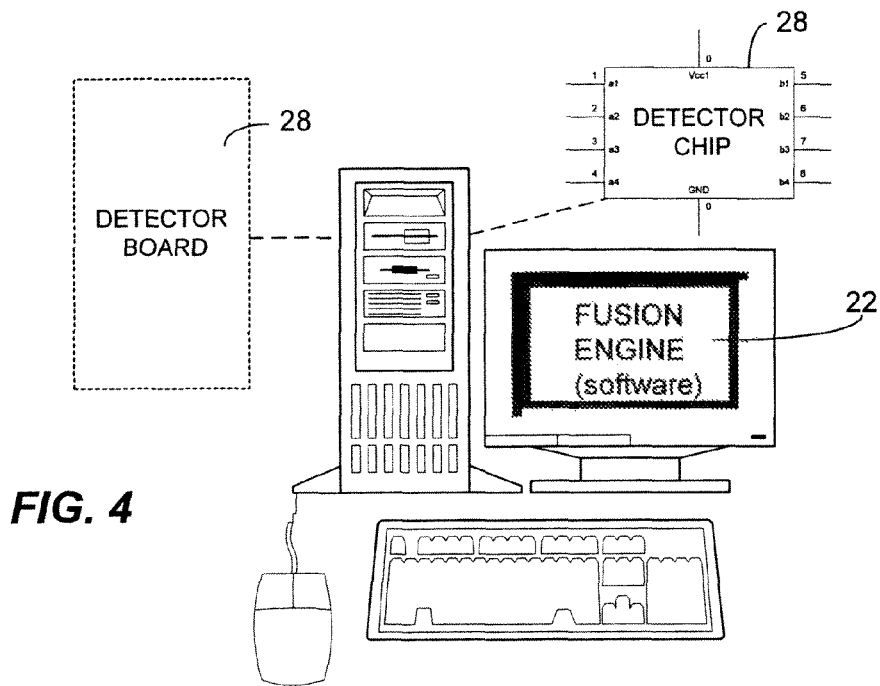
FIG. 4 is a functional block diagram illustrating exemplary software and hardware architecture for the present invention.

Referring now to FIG. 4, this Figure illustrates another functional block diagram of exemplary software and hardware architectures for the present invention. In this one exemplary embodiment, the data source 28 comprising a detector could be implemented in a hardware device such as a detector board or a detector chip so that the high speed intrusion detection system functions could be performed. In this exemplary embodiment, the fusion engine 22 could simply reside as a program module in software. FIG. 4 demonstrates that the data sources 28 that require access to high speed data streams can be separated from the fusion engine 22 such that network processing speeds can be achieved without significant interpretation or delay or both.

Figure 5A:
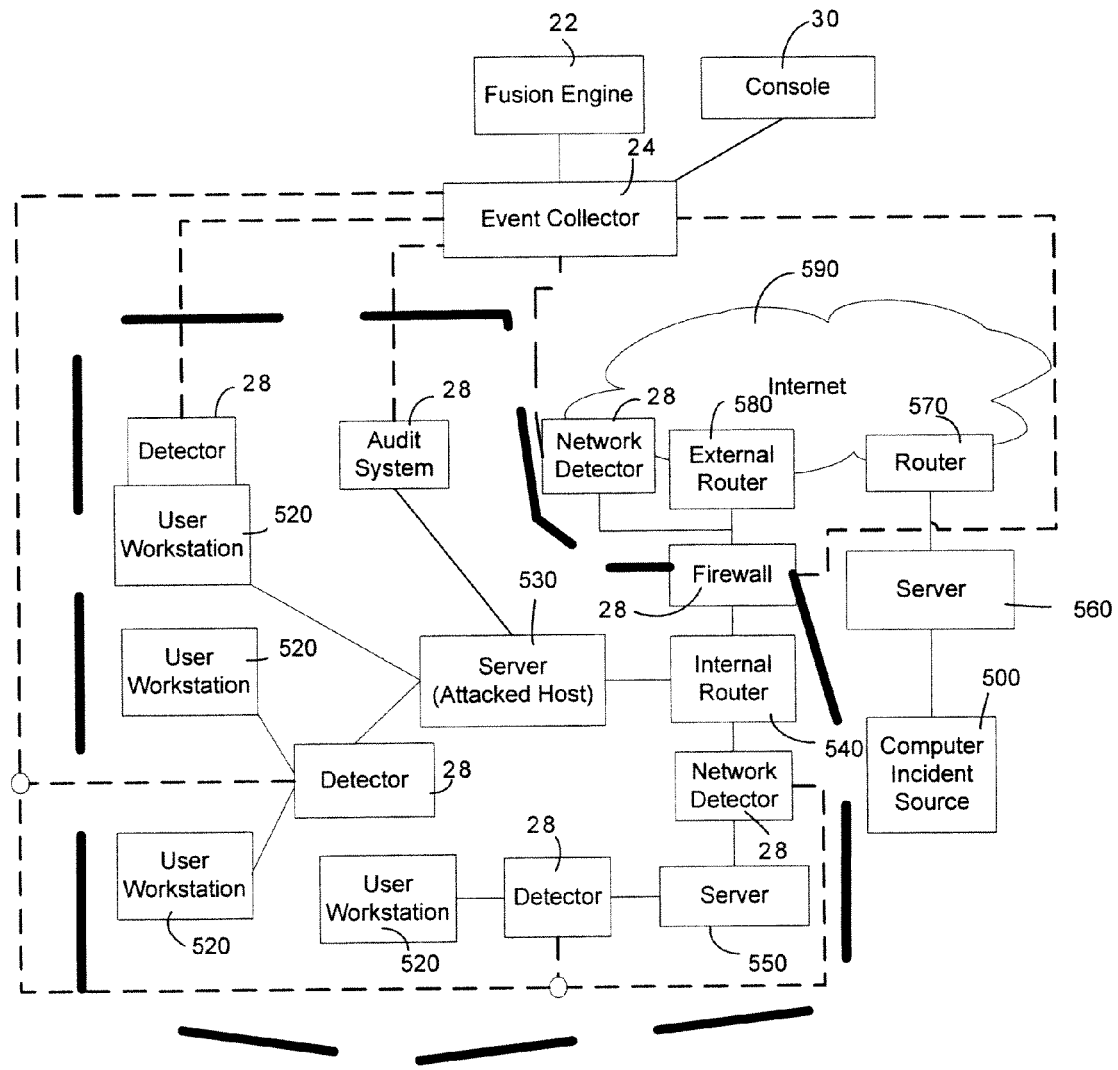
FIG. 5A is a functional block diagram illustrating security information data sources feeding information about a computer incident source to an event collector that is connected to a fusion engine.

Referring now to FIG. 5A, this Figure illustrates a functional block diagram of the security information data sources 28 feeding information about a computer incident source 500 to the event collector 24 which is also connected to the fusion engine 22. FIG. 5A further illustrates a network 510 that may comprise numerous data sources 28, user work stations 520, a server 530 that is a target for a computer incident source 500, an internal router 540, and the server 550. The network 510 is connected to the internet 590 by an external router 580 and by a firewall 28. The firewall 28 can comprise a bastion host or similar device. The firewall 28 can also be connected to an internal screening router 540 that may examine all packets of data travelling to and from the internal screening router 540. The user work stations 520 can be stand-alone personal computers that access the servers 530, 550.

The computer incident source 500 can be a computer or a network of computers that originate an attack against the network 510 and more specifically, the server 530 (attacked host). The computer incident source 500 can be connected to the server 560 of a local area network. Alternatively, instead of a server 560, the computer incident source 500 can be connected to a dial-in internet service provider (ISP) or any computer connected to the Internet. The server 560 or ISP (or other computer connected to the internet) can then be connected to a router 570. A router 570 provides access to a distributed computer network such as the Internet 590.

While the computer incident source 500 can be located outside of the network 510, it is possible for the computer incident source 500 to be located within the network 510. That is, a computer incident source 500 could be a user workstation 520 located within the network 510. For example, in case of a disgruntled employee within a company, a user workstation 520 could be used as the computer incident source 500 when the employee decides to interfere or hamper the operation of a network 510 or one or more other workstations 520 within the network 510.

Each of the data sources 28 has a data line illustrated by dashed lines that feed into the event collector 24. The dashed data lines could comprise actual physical data lines, however, these data lines are more for illustrative purposes to demonstrate that each of the data sources is operably linked to the event collector 24. Also, the event collector 24 could reside within the network 510 so that it would not be vulnerable to a direct attack from a computer incident source 500. The placement of event collector 24 within FIG. 5 illustrates the collection function of the event collector 24. FIG. 5 illustrates fundamental concepts of a system for managing security information rather than the actual physical architecture that would be implemented to support such a system.

Exemplary Data Processed by Fusion Engine

Figure 5B:
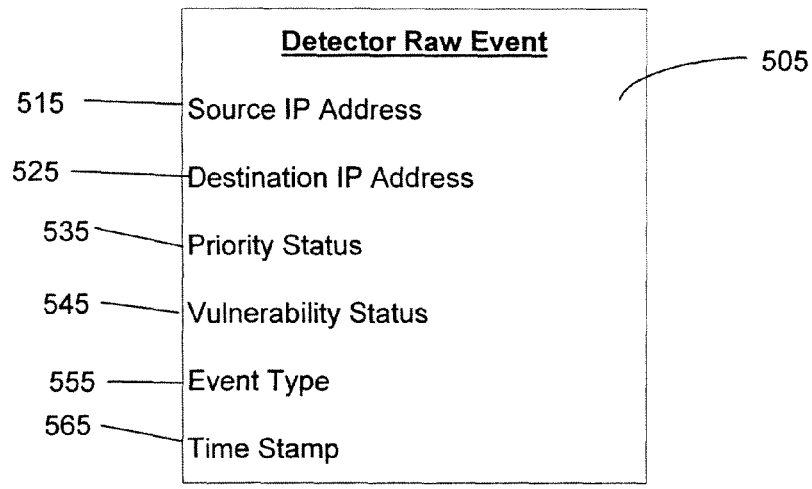
FIG. 5B is a diagram illustrating the type of data that may be present in a raw event generated by a detector in an intrusion detection system.

Referring now to FIG. 5B, this diagram illustrates an exemplary raw event 505 that is generated by a detector of an intrusion detection system. The raw event 505 may comprise a source Internet protocol address 515; a destination Internet protocol address 525; a priority status 535; a detector assigned vulnerability status 545, an event type parameter 555; and a time stamp 565. As will be discussed in further detail below, the priority status 535 assigned by detectors of an intrusion detection system are typically very conservative in nature. That is, since detectors must process information very quickly, they are unable to run complex algorithms or tests to ascertain the risk of certain computer raw events. Therefore, the priority status 535 of many raw events generated by detectors will be very high relative to an actual priority of a raw event.

Figure 5C:
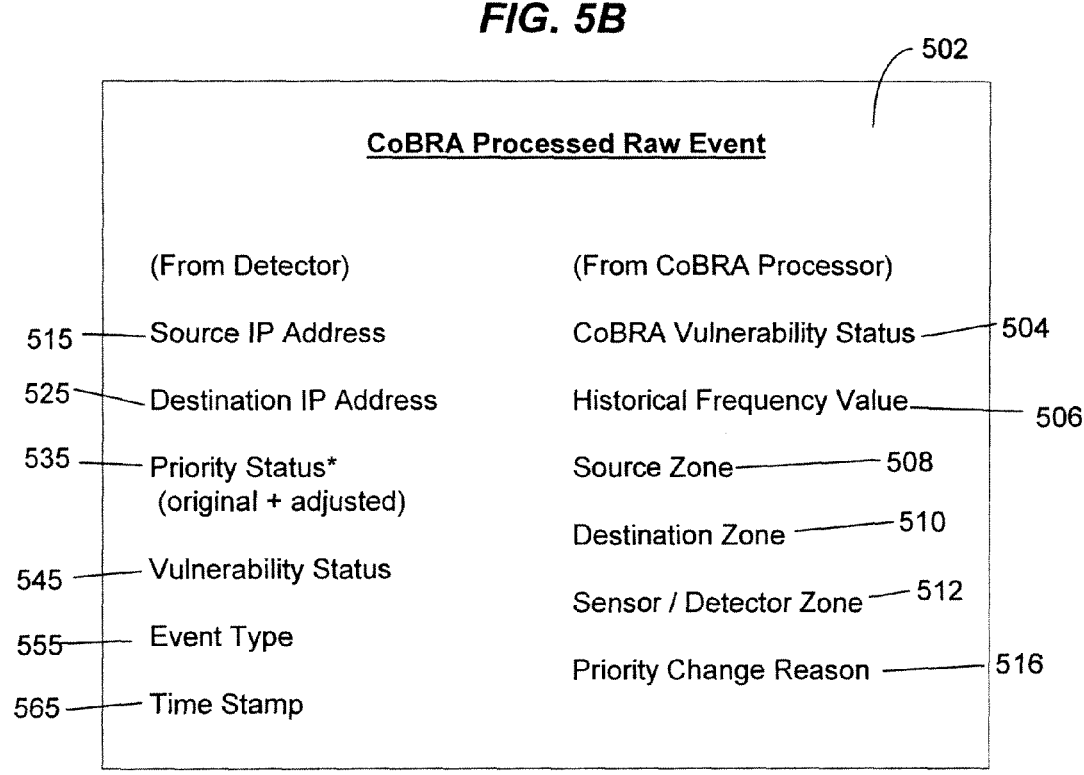
FIG. 5C is a diagram illustrating an exemplary raw event that has been processed by the CoBRA processor of the fusion engine.

Referring now to FIG. 5C, this Figure is a diagram illustrating a CoBRA—(Context Based Risk Adjustment) processed raw event. The CoBRA-processed raw event 502 typically contains all of the previously detector assigned parameters of the raw event and in addition the CoBRA-processed parameters that may comprise any one of the following: a CoBRA-assigned vulnerability value 504; a CoBRA-assigned historical frequency value 506; a CoBRA-assigned source zone value 508; a CoBRA-assigned destination zone value 510; a CoBRA-assigned sensor zone value 512; a CoBRA-assigned original priority status 514; and a priority change reason 516 text string comprising a reason why the priority of the raw event was adjusted (if adjusted). These CoBRA-assigned values will be discussed below in further detail with respect to FIG. 11 and FIG. 12.

Exemplary Raw and Correlation Events Processed by Fusion Engine

Figure 5D:
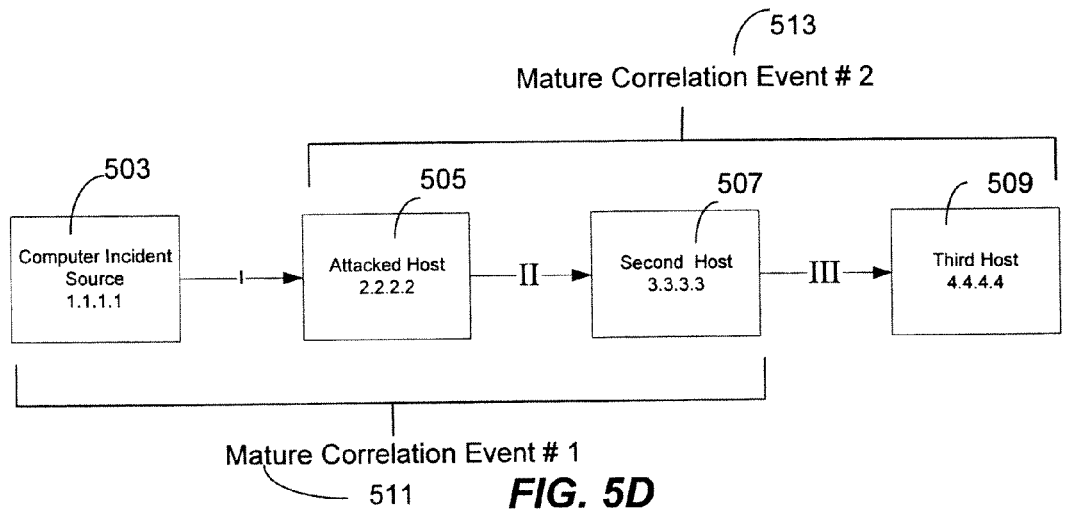
FIG. 5D is a functional block diagram illustrating an exemplary attack from attacked host computer security threat.

Referring now to FIG. 5D, this Figure is a functional block diagram illustrating an exemplary Attack From Attacked Host (AFAH) computer security threat. FIG. 5D illustrates a computer incident source 503 with an Internet protocol address of 1.1.1.1 sending an attack to host (attacked host) 505 that has an Internet protocol address of 2.2.2.2. The attack between the computer incident source 503 and the attacked host 505 may be characterized as a raw computer event I. After being attacked, the attacked host 505 then sends another attack to a second host 507, having an Internet protocol address of 3.3.3.3. The attack between the attacked host 505 and the second host 507 may be characterized as a second raw event II. The second host 507 generates an attack on a third host 509, having an Internet protocol address of 4.4.4.4. The attack between the second host 507 and third host 509 may be characterized as a third raw event III.

After processing the raw events I, II and III, the fusion engine 22 may identify the relationships between respective raw events. Therefore, after processing the raw events illustrated in FIG. 5B, the fusion engine may generate a mature correlation event 511 that corresponds to the first and second raw events I and II. Further, the fusion engine 22 may further generate a second mature correlation event 513 that identifies a relationship between the second and third raw events II and III. Further details of the processing performed by the fusion engine 22 to generate the first and second mature correlation events 511 and 513 will be discussed below in further detail with respect to FIG. 7 and FIG. 14.

Figure 5E:
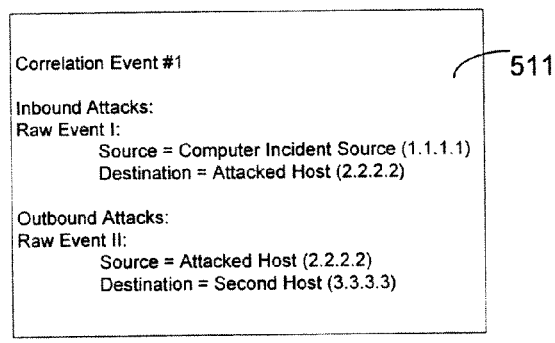
FIG. 5E is a diagram illustrating the possible data of an exemplary correlation event that is based on FIG. 5D.
Figures 12, 13, 15:
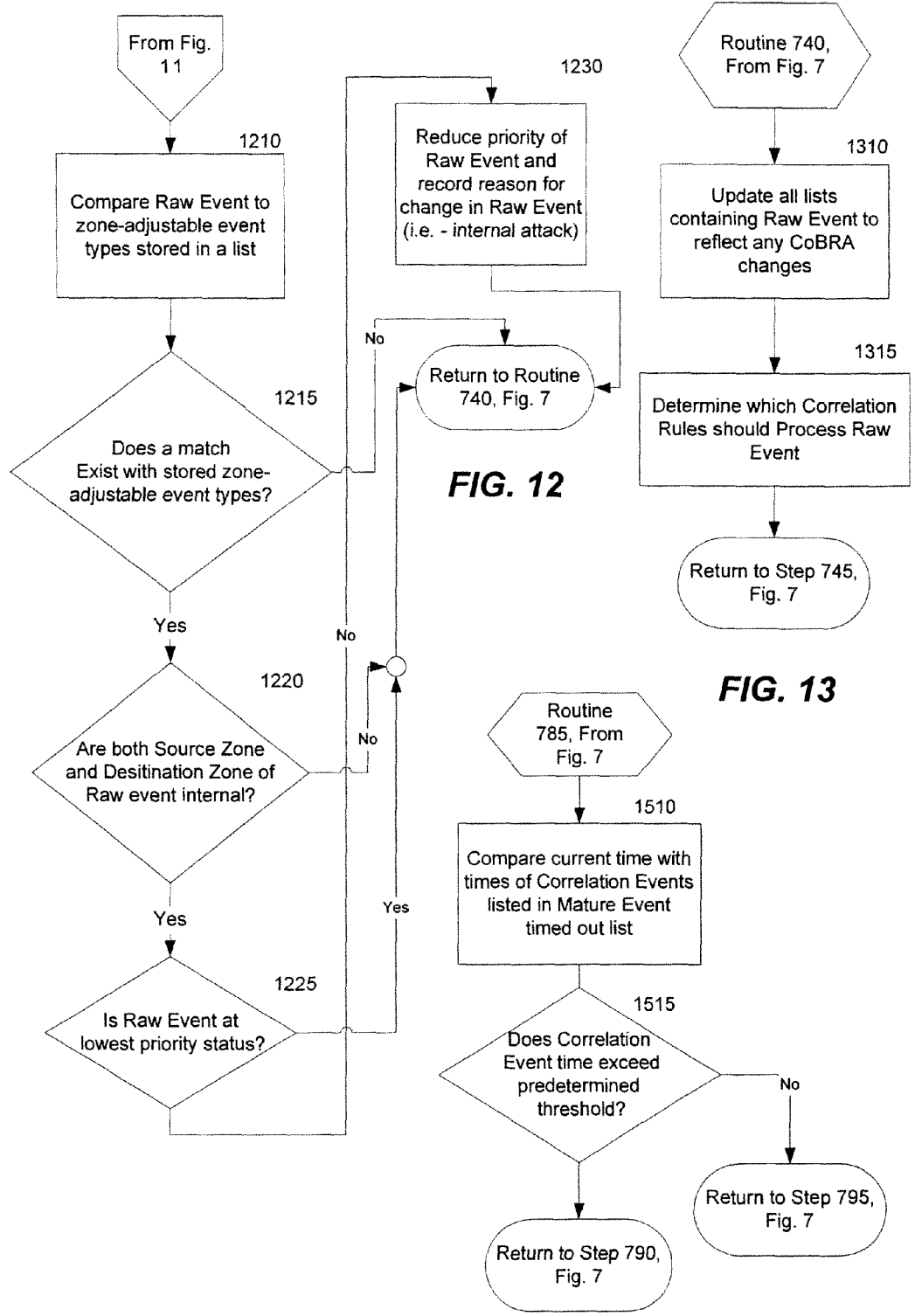
FIG. 12 is a logic flow diagram illustrating an exemplary subprocess or routine of FIG. 7 for adjusting the priority status of each real-time raw event.
FIG. 13 is a logic flow diagram illustrating an exemplary subprocess or routine of FIG. 7 for forwarding real-time raw event data to corresponding rules.
FIG. 15 is a logic flow diagram illustrating an exemplary subprocess or routine of FIG. 7 for determining whether a mature correlation event has stopped occurring.

Referring now to FIG. 5E, this Figure is a diagram illustrating the possible data of an exemplary correlation event that is based on FIG. 15. The correlation event 511 illustrated in FIG. 5E may comprise two sets of lists. The first list may identify inbound attacks relative to the attacked host 505 and outbound attacks relative to the attacked host 505. Further details of the first exemplary correlation event 511 will be discussed in further detail below with respect to FIG. 7 and FIG. 14.

Figure 5F:
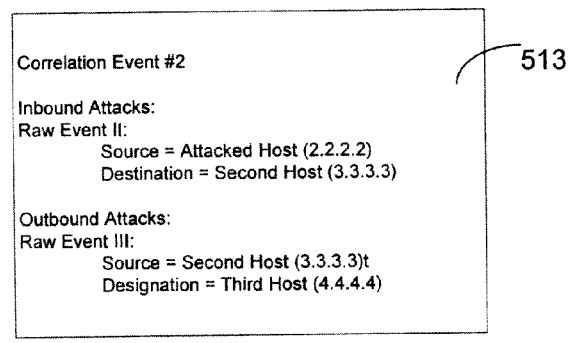
FIG. 5F is a diagram illustrating the possible data of another exemplary correlation event that is based on FIG. 5D.

Referring now to FIG. 5F, this Figure is a diagram illustrating the possible data of the second correlation event 513 illustrated in FIG. 15. The second correlation event 513 may also comprise two lists: one list identifying inbound attacks relative to the second host 507 and a second list identifying outbound attacks relative to the second host 507. Further details of the second mature correlation event 513 will be discussed below with respect to FIG. 7 and FIG. 14.

The exemplary attack from attacked host computer security threat illustrated by FIGS. 5D through 5F is just but one example of the possible computer security threats that can be analyzed with the fusion engine 22. As discussed above and below, other types of computer security threats are not beyond the scope of the present invention. In one exemplary embodiment, the fusion engine may track at least twenty different types of possible correlation events. Those skilled in the art will appreciate the present invention is not limited to the exemplary correlation events illustrated in FIG. 5D and that fewer or more correlation events can be utilized by the present invention without departing from the scope and spirit thereof.

Exemplary Software Components of Fusion Engine

Figure 6:
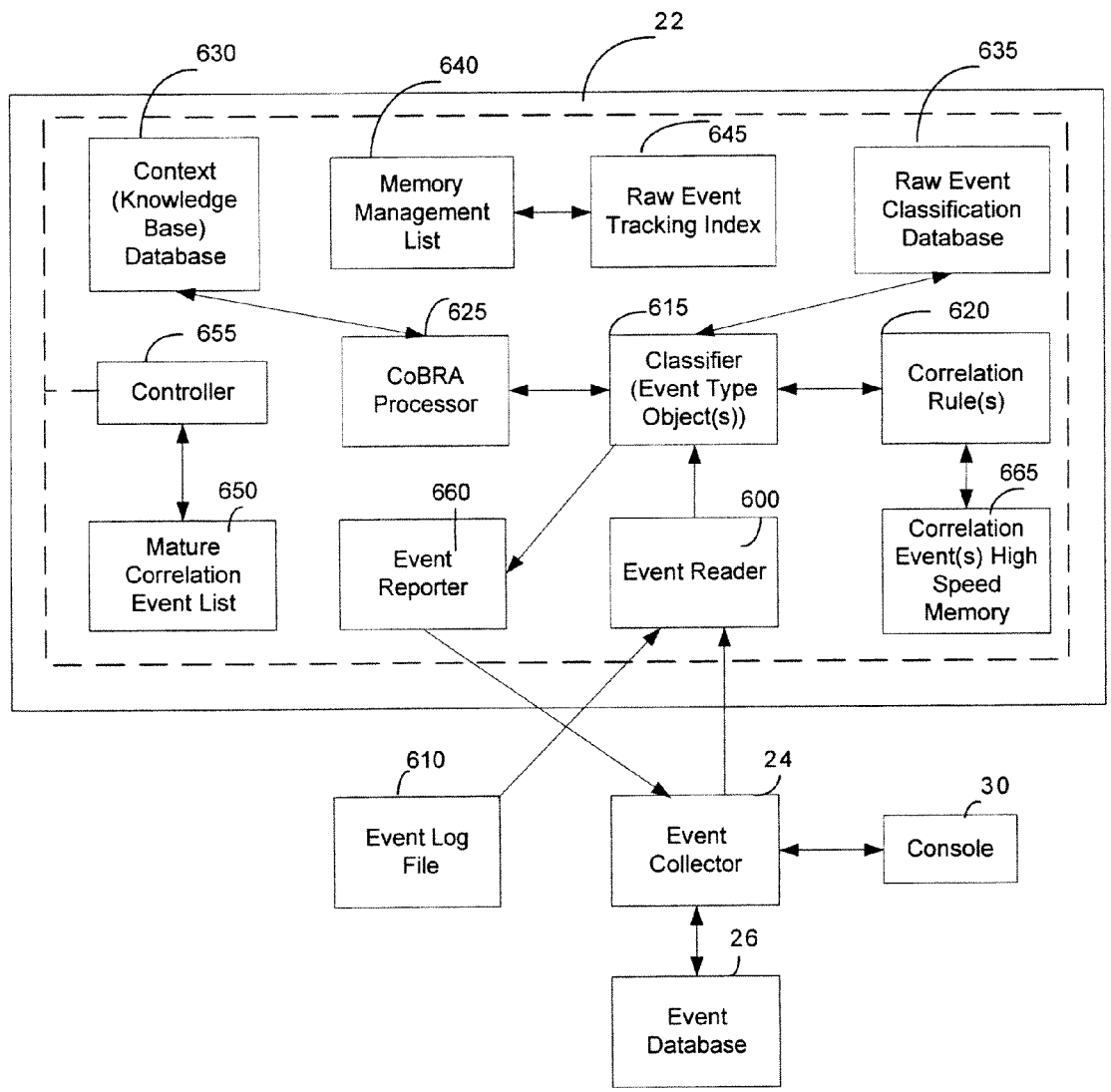
FIG. 6 is a functional block diagram illustrating some components of the fusion engine illustrated in FIG. 2.

FIG. 6 is a function block diagram illustrating some components of the fusion engine 22 that is illustrated in FIG. 2. Basically, FIG. 6 illustrates some of the numerous software components that make up the software architecture for the fusion engine 22.

The present invention includes a computer program which embodies the functions described herein and illustrated in the appended flow charts. However, it should be apparent that there could be many different ways of implementing the invention in computer programming, and the invention should not be construed as limited to any one set of computer program instructions. Further, a skilled programmer would be able to write such a computer program to implement the disclosed invention without difficulty based on the flow charts and associated description in the application text, for example. Therefore, disclosure of a particular set of program code instructions is not considered necessary for an adequate understanding how to make and use the invention. The inventive functionality of the claimed computer program will be explained in more detail in the following description in conjunction with the remaining Figures illustrating the program flow.

In one exemplary embodiment, the fusion engine 22 can be implemented with object-oriented programming. Therefore, some of the software components illustrated in FIG. 6 can have both data and code associated with a respective software object. However, the general functionality of each software object will be generally described such that a skilled programmer will be able to write a computer program to implement the disclosed functionality of the software object.

The fusion engine 22 may comprise several software components. In the exemplary embodiment illustrated in FIG. 6, the fusion engine 22 may comprise an event reader 600 that receives raw computer event information from the event collector 24. The event reader 600 is operably linked to the classifier 615. The classifier 615 organizes the raw event information received from the event reader 600. In other words, the classifier 615 categorizes the raw event information by separating the raw event information according to an event type property that is included in each raw event. The event type property of each raw event is typically generated by a detector in an intrusion detection system.

The classifier 615 can be responsible for forwarding raw event information to the CoBRA processor 625 and one or more correlation rules 620. The one or more correlation rules 620 may comprise algorithms for testing and determining whether a security incident may be occurring. The correlation rules track raw event information that is received from the classifier and stores the raw event information in correlation event high speed memory 665. The correlation event high speed memory 665 may comprise random access memory (RAM) for storing information. However, the present invention is not limited to RAM type memory. Other high speed memory devices are not beyond the scope of the present invention. The classifier 615 can be established based upon a raw event classification database 635. The classifier 615 can be generated upon initialization of the fusion engine 22 when event classification data is read from the raw event classification database 635 into the classifier 615.

The CoBRA processor 625 may comprise algorithms or software components for the context based risk adjustment of raw computer events. The CoBRA processor 625 can adjust the priority values of raw computer events by comparing a raw computer event against data contained within a context or knowledge base database 630. The priority status of raw events is typically established by detectors of intrusion detection systems before forwarding the raw event data to the fusion engine 22. After processing raw computer events, the fusion engine 22 can inform the event collector 24 whether a security event is occurring. The fusion engine 22 typically formats and sends one or more correlation events to the event collector via the event reporter 660. As noted above, a correlation event may comprise one or more computer events that are related to each other as determined by the fusion engine 22.

The fusion engine 22 may further comprise memory management devices that can conserve memory resources for the fusion engine 22. For example, in one exemplary embodiment, the fusion engine 22 may comprise a memory management list 640, a raw event tracking index 645 and a mature event list 650. The memory management list 640 is typically linked to the raw event tracking index 645. Further details of the functionality with respect to the memory management list 640, raw event tracking index 645, and the mature event list 650 will be discussed below in the brief process description of the software components illustrated in FIG. 6.

Exemplary Object-Oriented Architecture for FIG. 6

One of the software components of the fusion engine 22 that can be implemented as a software object, in one exemplary embodiment, is the event reader 600. The event reader 600 can receive raw computer events from either the event collector 24 or an event log file 610. The event log file 610 can comprise files having comma separated values (CSV) formats that store computer event data from an intrusion detection system. The event reader 600 typically reads in raw computer events or raw events which can be any computer activity that may be tracked by an intrusion detection system as a possible attack on a computer or a plurality of computers. The event reader typically creates raw event data objects (not shown) that are processed by other software components on a fusion engine 22.

In one exemplary embodiment, the event reader 600 can be linked to a classifier 615 which may comprise one or more event type objects. The classifier 615 receives the raw event objects that are generated by the event reader 600. A classifier 615 associates each raw event object with a corresponding event type object that has been established for a specific event type parameter 555. In other words, the classifier assigns raw event objects to event type objects according to the type of raw event. It is noted that each raw event received by the event reader 600 has been assigned a type or categorization based upon the intrusion detection system that generated the raw event.

One function of the classifier 615 is to categorize or classify each of the raw events and then forward the raw event objects to specific correlation rules 620 based upon their type. The correlation rules 620 can also take form of software objects that receive the raw event objects from the classifier 615.

The classifier 615 can also forward the raw event object to the Context Based Risk Adjustment (CoBRA) processor 625. The CoBRA processor is a risk assessment mechanism that can adjust priority parameters of raw event objects. The CoBRA processor 625 accesses a context or knowledge base database 630 in order to perform its context based risk adjustment for each received raw event object. Basically the CoBRA processor determines the risk of a raw computer event by assessing the event type parameter 555 in combination with environmental factors such as the destination interne protocol address of an attack in addition to the source of the attack.

The context or knowledge base database 630 can include vulnerability statuses assigned to machines within a network, historical event frequency values, and network zone definitions. The vulnerability statuses can be results of vulnerability scans performed by devices outside of the fusion engine 22 that determine the strength or resistance of a network or single computer to an attack. The historical event frequency value can comprise signatures or data relating to computer attacks that occur over very long periods of time. The network zone definitions can comprise values assigned to parts of a network based upon the amount and type of information that may be assessable in certain parts of a network. For example, it is useful to distinguish internal, external, and demilitarized zones as will be discussed below.

The fusion engine 22 can further comprise a raw event classification database 635 that can be responsible for establishing the different event type objects which form the classifier 615. The raw event classification database 635 can comprise one or more tables of security information. The tables can include information relating to the type parameter 555 of a raw event assigned by detectors. The raw event classification database 635 can categorize raw events based on their impact on the target host (confidentiality, integrity, or availability), their scope (network, host, or service), and the method they employ (backdooring, cloaking, etc.). Confidentiality events can be those events that indicate an attacker is attempting to obtain information from or about a host. Integrity events can be those events that indicate an attacker is attempting to alter data on a host, possibly to gain unauthorized access.

Availability events can be those events that indicate an attacker is attempting to cause a denial of service, such as by causing a host to crash. In addition to the above general criteria, specialized criteria useful in recognizing particular correlation events can serve as a basis for classifying events. For example, events that confirm the success of a denial of service attempt can be grouped into a category used by a correlation rule 620 that identifies denial of service attacks that are believed to have succeeded. However, the raw event classification database 635 is not limited to these categories or parameters. Other categories and parameters which further define raw events are not beyond the scope of the present invention.

The fusion engine 22 can further comprise a memory management list 640, a raw event tracking index 645, and a mature event list 650. The memory management list 640 enables the fusion engine 22 to manage its memory resources by eliminating or deleting the oldest raw events when memory resources exceed a predetermined threshold (i.e. —when memory resources are running low). The memory management list 640 can be implemented as a software object that deletes raw events that are considered oldest when memory resources run low. Related to the memory management list 640 is the raw event tracking index 645 which can also be implemented as another software object. A raw event tracking index 645 can identify which software objects may contain a particular raw event object. That is, the raw event tracking index identifies those software objects that may be storing a raw event that has now become old and should be deleted from the fusion engine 22.

Related to the memory management list 640 and raw event tracking index 645 is the mature correlation event list 650 which tracks those raw events that have been identified as a pattern of activity or an actual computer threat that should not be removed from the memory management list 640. In other words, the mature correlation event list identifies the raw events which should not be deleted from the fusion engine 22 since these events are deemed to be part of mature correlation events or actual computer security threats.

The fusion engine 22 may further comprise a controller 655 that may be responsible for the data flow between respective software objects. In other words, the controller 655 can be implemented as a high level software object which controls the data flow between lower level software objects.

The fusion engine 22 may further include the event reporter 660 that can also be implemented as a software object in the exemplary and preferred object-oriented programming environment. The event reporter 660 can be a software object that receives mature correlation events which are forwarded to the event collector 24. Mature correlation events can comprise one or more raw events that are associated together because the one or more raw events may pose an actual computer security threat.

Computer-Implemented Process for Managing Security Information

Figure 7:
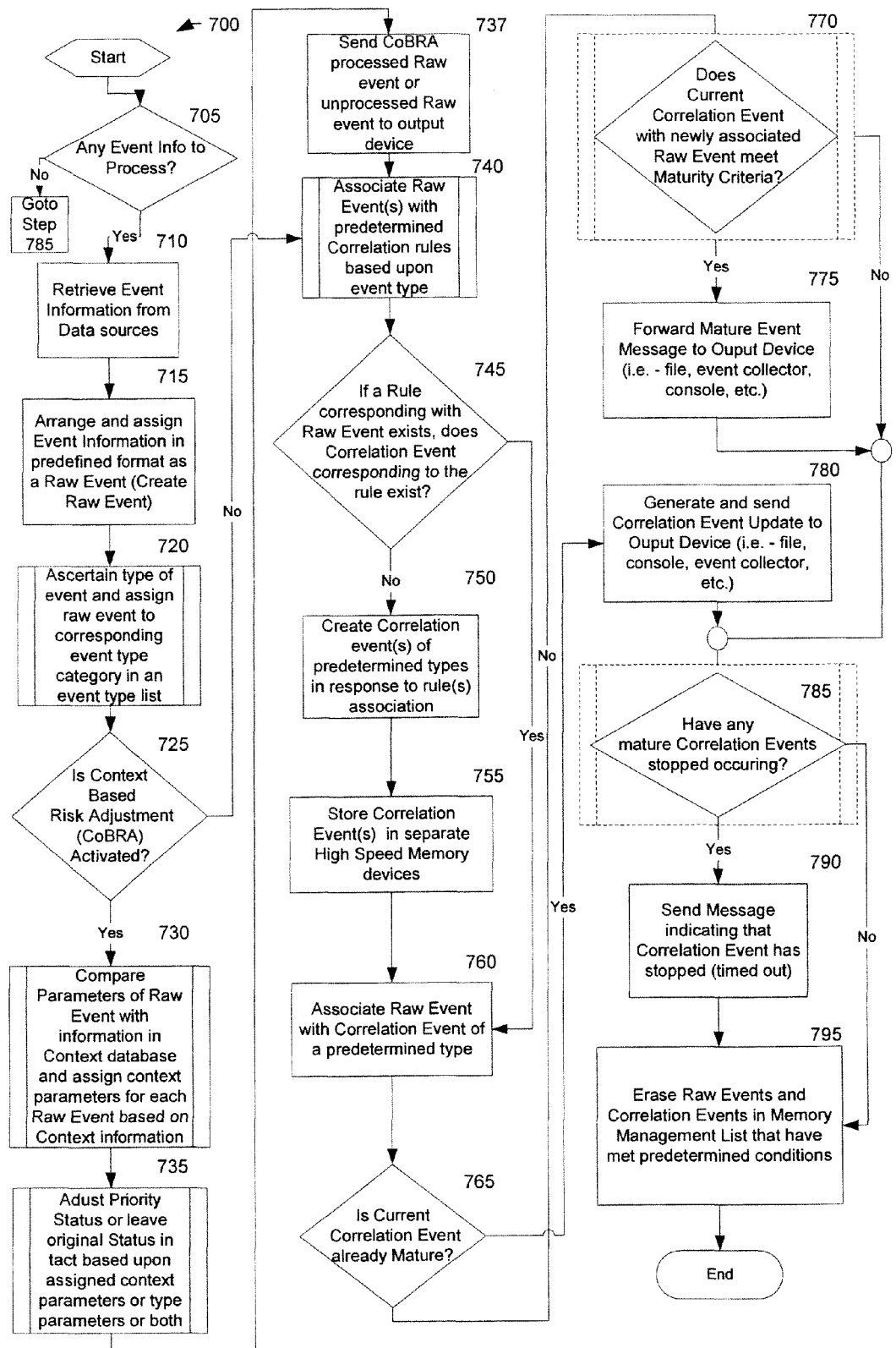
FIG. 7 is a logic flow diagram illustrating an exemplary embodiment of a method for managing security information collected from one or more data sources.

Referring now to FIG. 7, this Figure illustrates an exemplary logic flow diagram of a computer-implemented process for managing security information collected from one or more data sources. More specifically, the logic flow diagram illustrated in FIG. 7 illustrates a computer-implemented process for fusing or assembling security information received from multiple data sources and analyzing the security information in order to provide an organized presentation of information to one or more consoles. The logic flow described in FIG. 7 is the core logic of the top-level processing loop of the fusion engine 22, and as such is executed repeatedly as long as the fusion engine 22 is operating.

It is noted that the logic flow diagram illustrated in FIG. 7 illustrates a process that occurs after initialization of several of the software components illustrated in FIG. 6. That is, in the exemplary object-oriented programming architecture of the present invention, several of the software components or software objects that are required to perform the steps illustrated in FIG. 7 are initialized or created prior to the process described by FIG. 7. Therefore, one of ordinary skill in the art recognizes that several steps pertaining to initialization of the software objects illustrated in FIG. 6 are not illustrated. For example, as noted above, the software component or software object comprising the classifier 615 is established after initialization of the fusion engine 22.

During initialization of the fusion engine 22, the classifier 615 is built by reading information from the raw event classification database 635. The classifier 615 may comprise a comprehensive list of event type objects corresponding to the types of raw events that can be processed by the fusion engine 22, and a distinct event type object list for each event category defined in the raw event classification database 635. Each distinct event type list can contain the subset of the comprehensive event type list that constitutes the set of raw event types defined by the raw event classification database 635 as belonging to one category. While the initialization of the various software components illustrated in FIG. 6 are not described with specificity, a skilled programmer would be able to write such computer programs to implement the disclosed invention without difficulty based upon the following flow charts and associated description of the software architecture in the current application.

Certain steps in the processes described below must naturally precede others for the present invention to function as described. However, the present invention is not limited to the order of the steps described if such order or sequence does not alter the functionality of the present invention. That is, it is recognized that some steps may be performed before or after other steps without departing from the scope and spirit of the present invention.

Referring back to FIG. 7, this Figure provides an overview of the core logic of the top-level processing loop of the entire computer security management process where step 705 is the first step of the process 700. In decision step 705, it is determined whether there are any raw events to be processed by the fusion engine 22. As described above, raw events may comprise computer events reported from detectors of intrusion detection systems. Raw computer events identified by intrusion detection systems may include various parameters. For example, in one exemplary embodiment, each raw event may comprise a source internet protocol address, a destination internet protocol address, the type of computer event being reported, a priority status, a vulnerability status, and a time stamp.

If the inquiry to decision step 705 is negative, then the "no" branch" is followed in which the process proceeds to step 785. If the inquiry to decision step 705 is positive, then the "yes" branch is followed to step 710 in which the raw computer events or event information is retrieved from a data source. The data source may comprise at least one of the event database 26, an event log file 610, or the event collector 24 as illustrated in FIG. 8.

Figure 8:
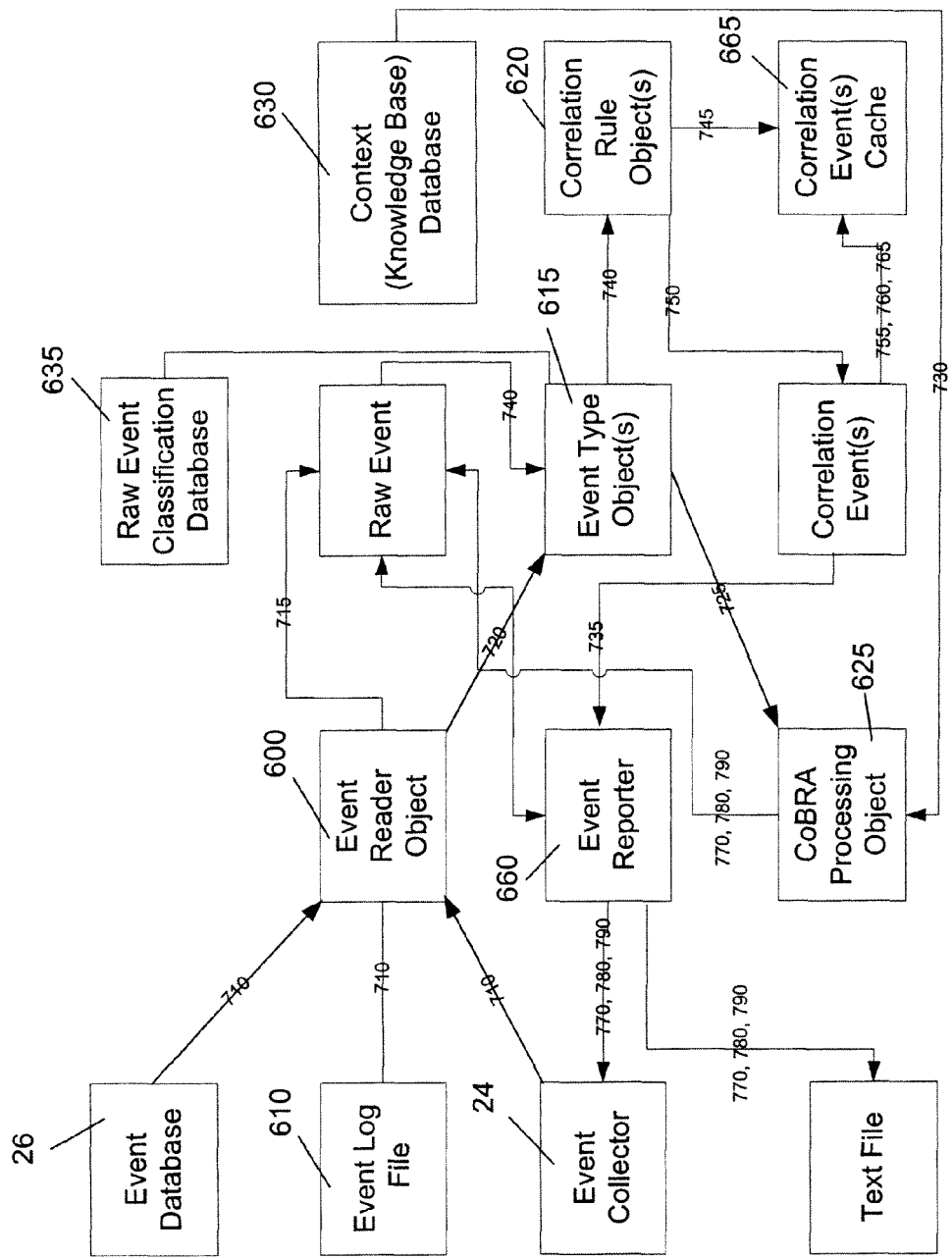
FIG. 8 is a data flow diagram illustrating the exchange of information between various software components that are illustrated in FIG. 6 and discussed with reference to FIGS. 7, and 9-15.

Referring briefly to FIG. 8, this Figure is a data flow diagram illustrating the exchange of information between various software components that are illustrated in FIG. 6. This data flow diagram of FIG. 8 parallels the steps described in FIG. 7. For example, step 710 for retrieving event information from data sources is illustrated in FIG. 8 where the event reader object 600 in the exemplary object-oriented software architecture reads in event information. References to FIG. 8 will be made throughout the detail description of FIG. 7.

Referring back to FIG. 7, after step 710 and in step 715, the event information or raw events are arranged and assigned a predefined format referred to as raw events. In other words, in the exemplary object-oriented programming environment, the event reader object 600 can create software objects for each raw event as it is received from one of the data sources such as the event database 26, the event collector 24, and the event log file 610. The event reader 600 generates the raw event objects in response to commands received from the controller 655. In other words, the controller 655 requests the event reader 600 to retrieve raw events from each of the data sources.

After step 715, in routine 720, the event type from each raw event is ascertained and each raw event is then assigned to a corresponding event type object in an event type list. In other words, in the exemplary object-oriented software architecture, each raw event object that is created by the event reader 600 is sent to a corresponding event type object that is present within the classifier 615. Further details of routine 720 will be discussed with reference to FIG. 9.

Next, in decision step 725, it is determined whether the context based risk adjustment processor (CoBRA) 625 is activated. In other words, a user may elect to not adjust any of the priority status information that is present in each raw event. As noted above, each raw event generated by a detector in an intrusion detection system typically contains parameters drawn to the priority of the event. That is, the detectors of intrusion detection systems assign relative values to computer events to measure the risk or potential damage that could be associated with a raw event. For example, a distributed attack against a network could be assigned a higher priority status relative to a computer attack against a single machine or computer.

If the inquiry decision step 725 is negative, then the "no" branch is followed to routine 740. If the inquiry decision step 725 is positive, then the "yes" branch is followed to routine 730 in which parameters of a raw event are compared with information in the context or knowledge base database 630. Also in this routine, context parameters are assigned for each raw event based upon the context information present in the context database 630. Referring briefly to FIG. 8, the classifier 615 containing the event type objects forwards each raw event to the CoBRA processing object or CoBRA processor 625. In routine 730, the CoBRA processor 625 can assign context parameters that relate to the environment or surrounding conditions of a raw event.

Following routine 730, in routine 735, the priority status of each raw event can be adjusted or the original status can be left intact based upon the CoBRA assigned context parameters or detector assigned type parameters or both of the raw event. Basically routines 730 and 735 can comprise the exemplary algorithms and methods of the CoBRA processor 625. Further details of routines 730 and 735 will be discussed below with respect to FIGS. 10, 11, and 12.

Next, in step 737, the CoBRA processed raw event or unprocessed raw event can be sent to an output device, such as the event collector 24. The event collector 24 then typically stores the CoBRA processed raw event or unprocessed raw event in the event database 26 and then forwards the event to the console 30. As will become apparent from the discussion below, the console 30 can be provided with unprocessed raw events, CoBRA processed raw events, and correlation events. All such events can be handled by the fusion engine 22 and forwarded by the event collector 24 so that they can be displayed to user. It is noted that when a raw event is received by the event collector 24 from a data source 28, the event collector first sends the raw event to the fusion engine 22. However, if after a predetermined amount of time, the fusion engine 22 does not respond, then the event collector 24 will store the event in the event database 26 and then forward the unprocessed (not handled by the fusion engine 22) raw event to the console 30.

In routine 740, the raw event is associated with correlation rules 620 based upon the event type assigned by a detector 28. In this routine, the classifier 615 containing the event type objects determines which correlation rule(s) 620 should process the raw event based upon the event type parameter 555. Further details of routine 740 will be discussed below with respect to FIG. 13.

In decision step 745, if a rule corresponding with a raw event exists, then it is determined whether a correlation event exists that is related to the correlation rule. Note that although depicted as a single process flow in FIG. 7, steps 745 through 780 are actually performed independently for each Correlation Rule 620 associated with the raw event. Basically, in decision step 745, the correlation rule object or correlation rule 620 determines if a correlation event object has been created for the current raw event being processed. As illustrated in FIG. 8, the correlation rule objects or correlation rule 620 check the correlation event cache or correlation event high speed memory 665 to determine whether the correlation event for the current raw event being processed has been created. As noted above, the correlation event (or correlation event object in an object-oriented software architecture) can comprise a number of raw events that are grouped together to form a single higher level event.

For step 745, each Correlation Event has an anchor Internet protocol (IP) address that is used to index the Correlation Event in the Correlation Event type's area within the correlation event cache 665. The anchor IP address will be the source IP address or destination IP address of one or more of the Raw Events within the Correlation Event, depending on the Correlation Event type. For example, the anchor IP address of the Attack From Attacked Host event is the IP address of the attacked host. This is the destination IP address of inbound attacks, and the source IP address of outbound attacks. The Correlation Rule for the Attack From Attacked Host event uses the destination IP address of an inbound Raw Event as the Correlation Event lookup key when attempting to retrieve the Correlation Event for which the Raw Event would be an inbound attack. The AFAH Correlation Rule uses the source IP address of the Raw Event as the Correlation Event lookup key when attempting to retrieve the Correlation Event for which the Raw Event would be an outbound attack.

If the inquiry to decision step 745 is positive, then the "yes" branch is followed to step 760. If the inquiry to decision step 745 is negative, then the "no" branch is followed to step 750 in which a correlation event of the predetermined type associated with the current correlation rule is created. That is, in the exemplary object-oriented software architecture, at this point in processing of a raw event's associated correlation rules 620, one or more correlation event objects can be created.

Next, in step 755, the correlation events are stored in the high speed memory devices 665. The high speed memory devices in one exemplary embodiment can comprise random access memory (RAM). However, other high speed memory devices are not beyond the scope of the present invention. Because of current network processing speeds and the corresponding volumes of information, it is necessary to use high speed memory devices like RAM so that rapid processing of raw information can be obtained.

In step 760, the raw event is associated with the corresponding correlation event (which was either just created in step 750, or retrieved from the correlation event cache 665 in step 745) based upon the type of raw event. In other words, in this step in the exemplary object-oriented software architecture, each correlation event object stores the raw event based upon its type. In addition to associating the raw event with the correlation event, the raw event tracking index 645 is updated to indicate that the raw event is associated with the correlation event.

Next in decision step 765, it is determined whether the current correlation event being processed is already mature. Typically, to be mature, a correlation event can contain two or more raw events that meet maturity criteria defined for that specific type of correlation event. The maturity criteria for each correlation event type are defined to identify the conditions under which the occurrence of two or more raw events indicates that a likely security incident is occurring. In step 765, the correlation event is being examined to determine if it had already been deemed mature as a result of processing of an earlier raw event.

If the inquiry to decision step 765 is positive, then the "yes" branch is followed to step 780. If the inquiry to decision step 765 is negative, then the "no" branch is followed to routine 770. In routine 770, it is determined whether the current correlation event with the newly associated raw event being processed meets or fulfills the maturity criteria set forth in one or more of the correlation rules 620. In routine 770, each of the rules that correspond to the type of raw event being processed determines whether the current raw event and any other raw events listed in the current correlation event together satisfy the maturity criteria as set forth in the rule. The present invention can include any number of rules that correspond to the type parameter of a given raw event.

In one exemplary embodiment, the fusion engine 22 can employ numerous correlation rules 620. The correlation rules can use the event categories defined in the Raw Event Classification Database 635 as a basis for identifying event patterns that indicate either malicious or nonmalicious activity. Many of the correlation events and corresponding correlation rules can reveal the intent of an attacker. The set of correlation events detected by the present invention and corresponding correlation rules includes, but is not limited to, the following:

1) Attack From Attacked Host. This event can be generated when an Integrity attack is seen against a host followed by a Confidentiality, Integrity, or Availability attack originating from that host.
2) Availability Attack Sweep (Multihost DoS Attack). This event can be generated when two or more different types of Availability attacks originating from the same source IP address are seen against multiple target IP addresses.
3) Confidentiality Attack Sweep (Multihost Information Gathering). This event can be generated when two or more types of Confidentiality attacks are seen originating from a single source IP address against multiple target IP addresses.
4) DoS Followed By Confirming Event. This event can be generated when an Availability attack is seen against a target IP address followed by another event indicating that the target is no longer behaving normally. Confirming events include events detected by a network-based sensor indicating the host is not reachable (for example, detection of ARP requests from other hosts for the target), and events detected on the target system itself by a host-based sensor indicating that system resources (such as memory) have become exhausted.
5) External Source Using Internal IP Address. This event can be generated when a network-based sensor that monitors an external network detects a duplicate internal IP address. The occurrence of this condition indicates that an external host is attempting to use the IP address of an internal host, a practice known as spoofing.
6) Integrity Attack Followed By Remote Login. This event can be generated when an Integrity attack is seen against a host followed by a remote login originating from that host.
7) Integrity Attack Followed By Start Of Service. This event can be generated when an Integrity attack is seen against a host followed by a report from a host-based sensor that a new service has been started on the host.
8) Internet Scanner Scan. This event can be generated when an ISS Internet Scanner scan is detected from a host. For a period following detection of the start of the scan, all other events originating from the same host are subsumed into the Internet Scanner Scan event. If the source IP address is configured as an approved scan source, the event can be treated as a nonmalicious event; otherwise it can be treated as a malicious event.
9) Probe Followed By Integrity Attack. This event can be generated when a Probe event is seen against a host followed by an Integrity attack against the host.
10) Integrity Attack Sweep (Trolling For Victims). This event can be generated when two or more types of Integrity attacks are seen originating from a single source IP address against multiple target IP addresses.
11) Login From DoS-attacked Host. This event can be generated when a remote login is seen from a source IP address that is currently the target of an ongoing Availability attack. This combination of events can indicate that an attacker is masquerading as a particular host (the target of the Availability attack) in order to exploit network trust relationships to access other machines on the network.

12) Login Failure Of One User On Multiple Hosts. This event can be generated when login failures of the same user are reported by multiple network- or host-based sensors.
13) Suspicious Activity Followed By Availability Attack. This event can be generated when an event that involves a Cloaking method is reported, followed by an Availability attack. The term "cloaking" applies to any technique that attempts to conceal an attack from intrusion detection systems.
14) Suspicious Activity Followed By Integrity Attack. This event can be generated when an event that involves a Cloaking method is reported, followed by an Integrity attack. The term "cloaking" applies to any technique that attempts to conceal an attack from intrusion detection systems.
15) Suspicious Activity Followed By Integrity Attack. This event can be generated when an event that involves a Cloaking method is reported, followed by an Integrity attack. The term "cloaking" applies to any technique that attempts to conceal an attack from intrusion detection systems.
16) Sustained Availability Attack (Focused DoS Attack). This event can be generated when two or more types of Availability attacks are seen from a single source IP address targeted at a single destination IP address.
17) Sustained Confidentiality Attack (Focused Information Gathering Attack). This event can be generated when two or more types of Confidentiality attacks are seen from a single source IP address targeted at a single destination IP address.
18) Sustained Integrity Attack (Focused Break-in Attempt). This event can be generated when two or more types of Integrity attacks are seen from a single source IP address targeted at a single destination IP address.
19) Web Scan. This event can be generated when multiple Web-related attacks targeted against a Web server are detected within a certain interval. By examining features of the Web-related attacks such as the sequence of URLs being probed, it can be possible to identify the use of specific Web scanning tools such as Whisker.

Figure 14:
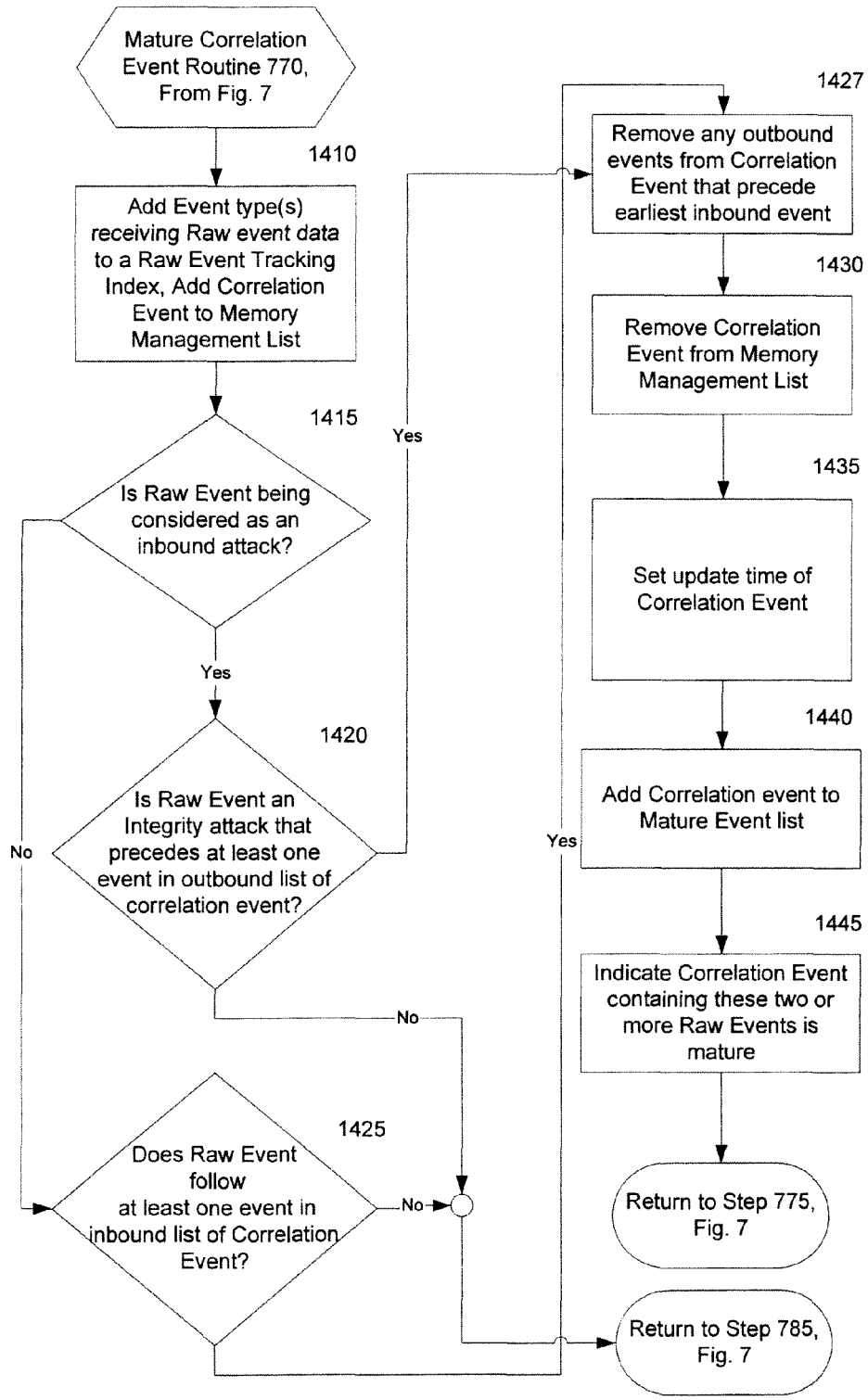
FIG. 14 is a logic flow diagram illustrating an exemplary subprocess or routine of FIG. 7 for determining whether a correlation event is mature.

Additional rules may be employed without departing from the scope and spirit of the present invention. Further details of routine 770 will be discussed in further detail below with respect to FIG. 14. However, it is noted that routine 770 as illustrated in FIG. 14 only covers the application of one rule. The exemplary rule illustrated in FIG. 14 is the rule corresponding to the "Attack From Attacked Host" (AFAH) correlation event listed above. The attack from attacked host scenario will also be described in further detail below with respect to FIGS. 5D through 5F.

If the inquiry to decision routine 770 is negative, then the "no" branch is followed to decision routine 785. If the inquiry to decision routine 770 is positive, then the "yes" branch is followed to step 775 in which a mature event message is generated and forwarded to an output device such as the event collector 24. In step 775, the event reporter 660 receives an indication that the correlation event is mature and then the event reporter 660 forwards this message to the event collector 24.

In step 780, a correlation event update notification is sent to the output device when a raw event is added to a correlation event that is already mature. In this step, the event reporter forwards the correlation event update to event collector 24 which, in turn, updates the representation of the correlation event in the Event Database 26 and forwards this information to the console 30 where it may be viewed by a user. This allows the user to be notified when additional raw events occur that are part of an ongoing security incident (i.e., a mature correlation event).

Next, in decision routine 785, it is determined whether any mature correlation events have stopped occurring. Further details of decision routine 785 will be discussed below with respect to FIG. 15.

If the inquiry to decision routine 785 is negative, then the "no" branch is followed to step 795. If the inquiry to decision step 785 is positive, then the "yes" branch is followed to step 799 in which a message is sent indicating that a correlation event has stopped occurring. This message can be forwarded from the event reporter 660 to the event collector 24. In turn, the event collector 24 would update the representation of the now-concluded correlation event in the event database 26 and then forward this message to the console 30.

In step 795, the oldest raw events and immature correlation events in the memory management list may be erased. Because the fusion engine 22 has a limited amount of memory, it is necessary to keep the memory filled with raw events that are the most likely to become mature. The fusion engine has several memory usage monitoring devices such as the memory management list 640, the raw event tracking index 645, and the mature event list 650. In one exemplary embodiment, the memory usage monitoring devices of the fusion engine determine how much memory is available and when the memory is close to being filled to capacity, the memory usage monitoring devices will erase the oldest existing stored raw events and immature correlation events in order to increase available memory. Raw events that are included within mature correlation events are removed from the memory management list 640 but are not erased. Whenever a raw event is deleted, the raw event tracking index 645 is used to locate any immature correlation events that contain the raw event, and the raw event is removed from those immature correlation events. When a raw event is removed from an immature correlation event and the immature correlation event then contains no other raw events, the immature correlation event is also erased.

Figures 9, 10:
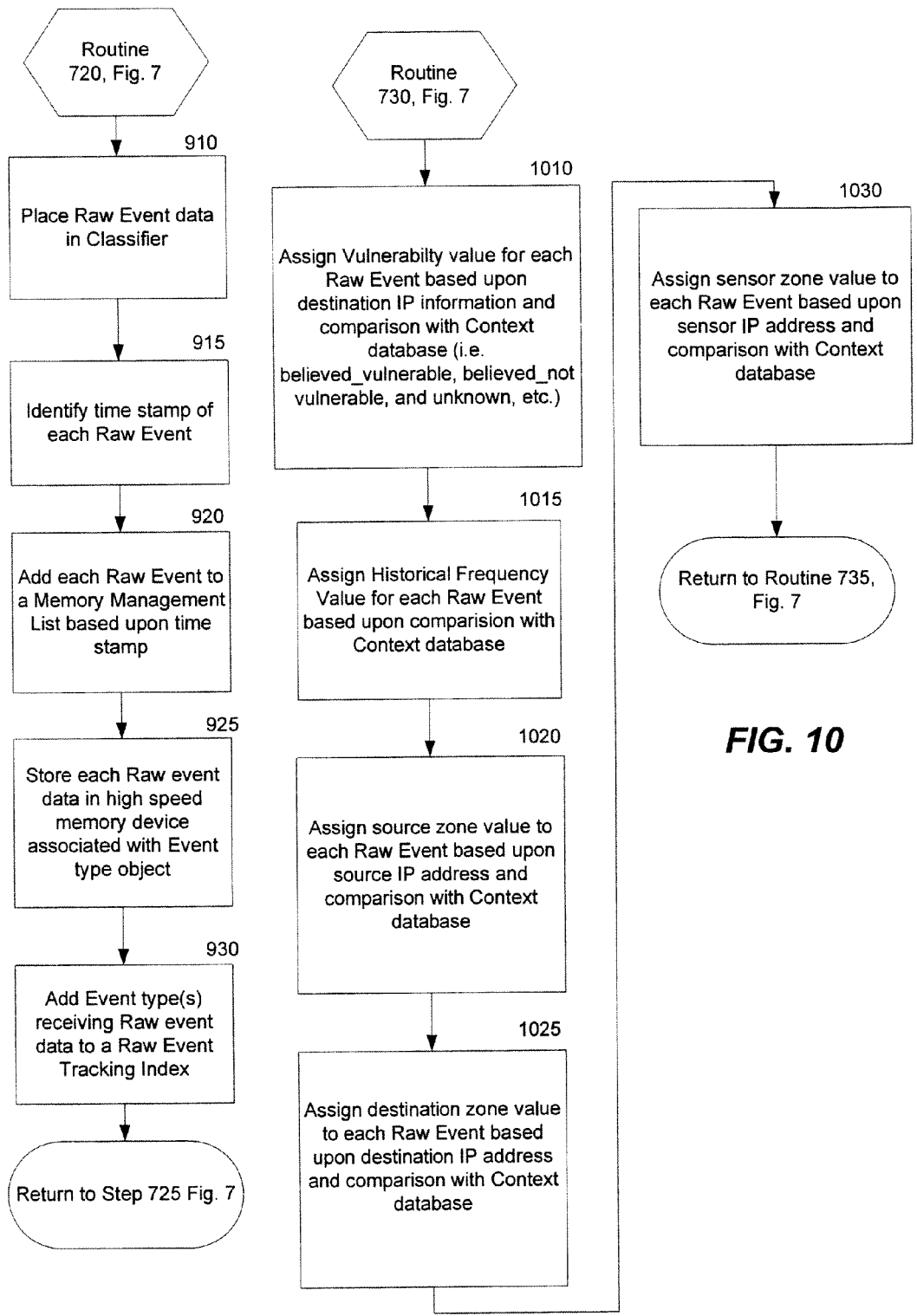
FIG. 9 is a logic flow diagram illustrating an exemplary subprocess or routine of FIG. 7 for assigning real-time raw events to one or more categories in an event type list.
FIG. 10 is a logic flow diagram illustrating an exemplary subprocess or routine of FIG. 7 for assigning context parameters to each real-time raw event.

Referring now to FIG. 9, this Figure illustrates the computer-implemented process for routine 720 of FIG. 7 which identifies the type of raw event and assigns each raw event to a corresponding event type object of the classifier 615. Routine 720 begins with step 910 where each raw event is matched with a corresponding event type in the classifier 615. Next, in step 915, the time stamp of each raw event is identified. In step 920, each raw event is added to the memory management list 640 based upon the time stamp identified in step 915. The entries in this list are typically maintained in order by timestamp to facilitate locating the oldest events during the memory cleanup processing described above In step 925, each raw event is stored in the high speed memory device associated with its event type object as contained in the classifier 615. Next, in step 930, each event type object receiving a raw event is added to the raw event tracking index 645. That is, typically, each software component of the fusion engine registers itself with the raw event tracking index 645 upon receiving a raw event. In this way, when a raw event is determined to be deleted from the system, the raw event tracking list 645 can be used to identify the location of the raw event references that need to be erased. After step 930, the process returns back to decision step 725 of FIG. 7.

FIG. 10 illustrates the computer-implemented process for routine 730 of FIG. 7 in which parameters of each raw event are compared with the context or knowledge base database 630. Also in this routine, additional parameters are assigned to each raw event based upon this comparison with the context database 630. As noted above, the context database 630 can comprise environmental information that may be helpful in evaluating the importance of a raw event. For example, the context database 630 can comprise vulnerability information about machines or computers within a network, the relative location of a computer or detector based upon predetermined zones, and information relating to historical event frequency.

The vulnerability information of the context database 630 is usually derived from scans made across a network to determine the relative security risk that may be present at one or more machines that make up a network. A tool that analyzes historical raw event logs for the network being monitored by the fusion engine 22 typically derives the historical event frequency information of the context database 630. This tool typically calculates average event frequencies for groups of events sharing the same raw event type, source internet protocol address, and destination interne protocol address, though other approaches to grouping raw events for the purpose of calculating average event frequencies could be used are within the scope of the present invention. The zone definitions of the context database 630 are usually derived by categorizing parts of a network as they relate to the entire network. For example, an internal zone and demilitarized zone (DMZ) may be defined such that the internal zone includes the internet protocol network addresses of the networks that should not be accessible from the Internet, and the DMZ zone includes the internet protocol network addresses of the networks that are accessible from the Internet. These zones would be defined as appropriate for the specific network being monitored by the fusion engine 22.

Routine 730 is typically performed by the CoBRA processor 625. The CoBRA processor 625 typically examines each raw event and compares it to the context database 630. More specifically, in step 1010 (the first step of Routine 730) a CoBRA vulnerability status 504 is assigned for each raw event based upon destination interne protocol address information and a comparison with the context database 630. In one exemplary embodiment, the vulnerability value assigned can be any one of the following: believed vulnerable; believed not vulnerable; and unknown.

Next, in step 1015, a historical frequency value 506 is assigned for each raw event based upon another comparison with the context database 630. This value can be a number of events per unit time, such as events per day, or a mathematically related value, such as an average time between events. The historical event frequency value typically indicates how frequently raw events of a particular type from a particular source machine to a particular destination machine are seen on the network being monitored by the fusion engine 22. Historical frequency data is used by the fusion engine to aid in distinguishing events caused by normal non-malicious network activity from those caused by unusual and malicious activity.

In step 1020, a source zone 508 value is assigned to each raw event based upon the source internet protocol address of the raw event and a comparison with the context database 630. In step 1025, a destination zone 510 value is assigned to each raw event based upon the destination internet protocol address of each raw event and a comparison with the context database 630.

In step 1030, a sensor zone 512 value is assigned to each raw event based upon the sensor internet protocol address and a comparison with the context database 630. The sensor zone value can comprise the internet protocol address of the sensor or detector of an intrusion detection system that detected the suspicious computer activity and generated the raw event. After step 1030, the process returns to routine 735 of FIG. 7.

Figure 11:
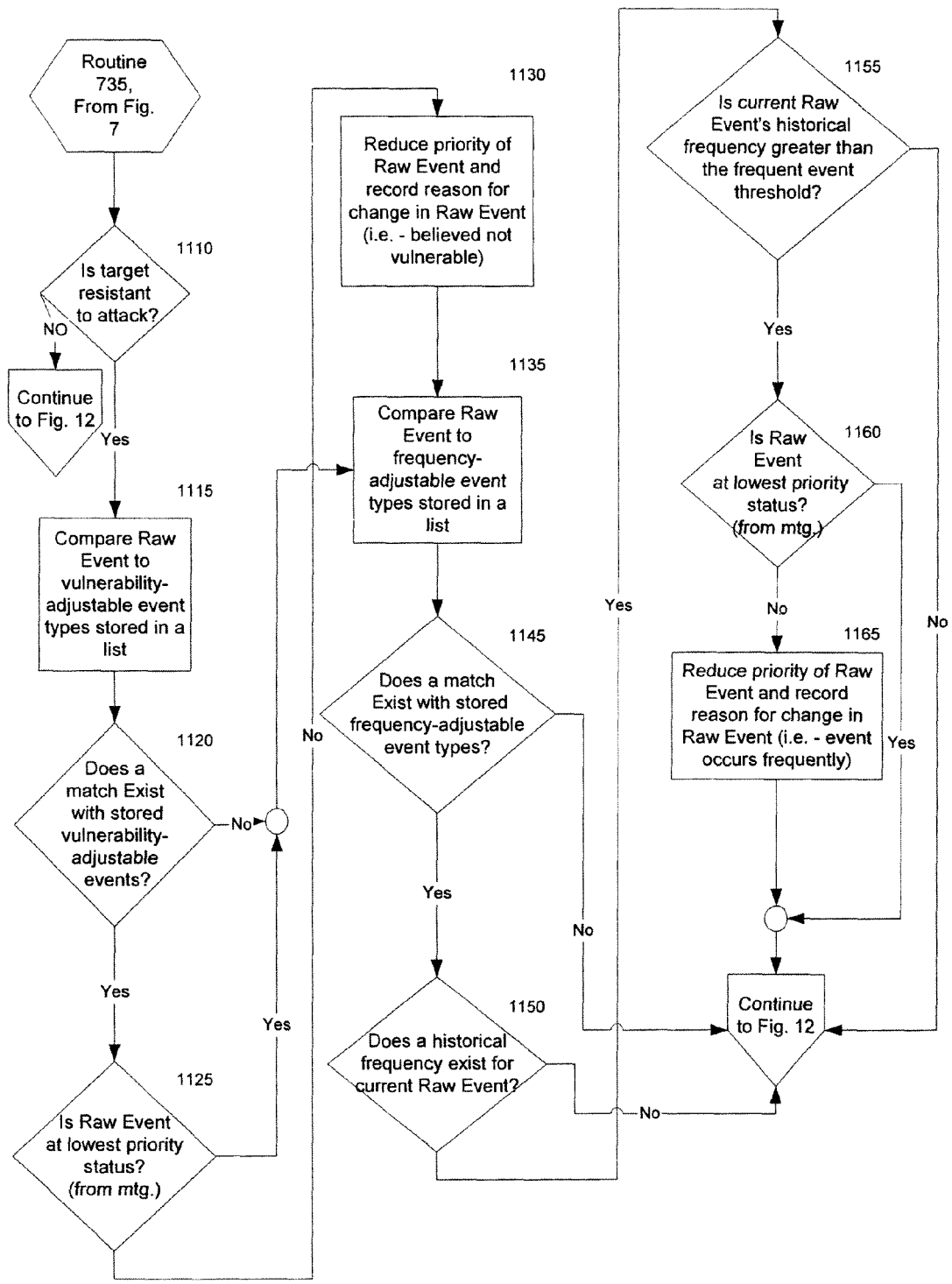
FIG. 11 is a logic flow diagram illustrating an exemplary subprocess or routine of FIG. 7 for adjusting the priority status of each real-time raw event.

Referring now to FIG. 11, this Figure illustrates the computer-implemented process for routine 735 of FIG. 7, which can adjust the priority status or leave an original priority status of a raw event intact based upon the CoBRA-assigned context parameters or detector-assigned type parameters or both. Routine 735 is another core function of the CoBRA processor 625. This routine enables the fusion engine to rank raw events based upon their importance to a network or a computer being protected. In this way, the security administrator can monitor computer security events more efficiently and effectively, since the important computer security events will have a higher ranking and priority relative to other lower-level security events.

The present invention can employ user-defined attributes for those events and parts of a network that are most important to a user. For example, the zone definitions that form part of the context database 630 can be supplied by the user. In one exemplary embodiment, an internal zone and a so-called demilitarized zone (DMZ) of the monitored network can be established by the user. Rather than being explicitly defined by the user, an external zone can be any IP address that doesn't fall within an explicitly defined zone or zones supplied by the user. The present invention is not limited to these types of zones and can include other types of zones such as a business partner zone, for example. Those skilled in the art will appreciate that the present invention can be designed to associate Internet protocol addresses with any number of zones defined by a user.

As noted above, each raw event comprises a priority status parameter 535 that was assigned to it by a detector within an intrusion detection system. In one exemplary embodiment, the priority status parameter can comprise any one of the following three values: 1, 2, or 3. The highest priority status value in the exemplary embodiment is typically the number 1. Meanwhile, the lowest priority status in the exemplary embodiment is typically the value of 3. The mid-range priority value is typically the number 2. Adjustments of the priority status values for each raw event are necessary since the priority status values assigned by the detectors typically are very conservative in nature. That is, raw events are typically the result of simple processing techniques that must occur at the detector level in order to maintain high network traffic speeds.

Therefore, the priority status values coming from the detector level of conventional intrusion detection systems typically are defined as appropriate for the worst-case scenario that could apply for each event type. For example, in the exemplary embodiment, if a given type of raw event could have an actual priority of 1, 2, or 3 depending on the circumstances that apply on a given network, the detector would typically assign the worst-case priority (denoted as one (1) in the exemplary embodiment) to all events of this type. Whenever the CoBRA processor 625 modifies the value of the priority status 535, it does so only after storing the both the original detector-assigned priority status and the updated or CoBRA-adjusted priority parameter in priority status 535. That is, in the exemplary embodiment, after CoBRA processing and if priority is adjusted, the adjusted priority status 535 will contain two values: the original detector-assigned priority status and the CoBRA-adjusted priority status.

The fusion engine 22 permits the ranking of raw events based upon the environmental conditions or surroundings in which a raw event is generated. In this way, the security network administrator will only be presented with the computer security events that are most important to the network or computer being monitored. The present invention is not limited to the priority status scale illustrated. That is, the present invention is not limited to a priority scale that spans between 1 and 3 where one is designated as the highest priority. Other ranges or values and increments between values are not beyond the scope of the present invention. Those skilled in the art will appreciate that more complex scales can be generated to further reduce the possibility of ranking an unimportant raw event over an important raw event.

Routine 735 begins with step 1110, in which it is determined whether a target of a raw event is resistant to the computer attack. This determination is made based on the CoBRA vulnerability status 504 value of the raw event previously established by step 1010 of procedure 730 described in FIG. 10. If the inquiry to decision step 1110 is negative, then the "no" branch is followed where the process continues to step 1210 of FIG. 12. If the inquiry to decision step 1110 is positive, then the "yes" branch is followed to step 1115. In step 1115, the raw event is compared to vulnerability-adjustable event types stored in a list in the context database 630. These vulnerability-adjustable event types stored in the context database 630 are events identified by either a user or a system for which the assessment of a machine's vulnerability status is believed trustworthy and for which therefore it is allowed to adjust priority based on vulnerability status information.

Alternatively, in another embodiment (not illustrated) the context database 630 can identify those raw event types for which a user or system does not believe the assessment of vulnerability status to be trustworthy, and the assessment of vulnerability status can be deemed trustworthy for all other event types. In this way, raw events that are not desired to be adjusted with respect to their priority status can be identified so that the CoBRA processor 625 will not reduce the priority of such raw events. In another alternative exemplary embodiment (not shown), the context database 630 can also contain both types of lists. That is, the context database 630 can comprise a list of raw event types that are permitted to have the priority status to be adjusted and a list containing raw event types that are not permitted to have the priority status adjusted. In this case a conflict resolution rule must also be established, so that if a particular event type appears in both lists, it is well-defined which entry will take precedence. Those skilled in the art will appreciate that other configurations of lists are not beyond the scope of the present invention.

Next, in decision step 1120, it is determined whether a match exists with the stored vulnerability-adjustable events of the context database 630. If the inquiry to decision step 1120 is negative, then the "no" branch is followed to step 1135. If the inquiry to decision step 1120 is positive, then the "yes" branch is followed to decision step 1125.

In decision step 1125, it is determined whether the current raw event being processed is at its lowest priority status. In other words, if the current raw event being processed has an exemplary priority status value of 3, then it is recognized that its priority cannot further be adjusted. Therefore, if the inquiry to decision step 1125 is positive, then the "yes" branch is followed to step 1135. If the inquiry to decision step 1125 is negative, then the "no" branch is followed to step 1130, in which the priority status 535 of the current raw event is reduced and the reason for the change in priority status 535 is recorded in the raw event. For example, in the exemplary embodiment, if a raw event has an original priority status value of a 1, and if the CoBRA processor 625 determines that the raw event is not believed to be vulnerable, then it will adjust the original priority status value of 1 to a lower value such as the value of 2 (the mid-range priority status value). The reason for changing the priority status value is recorded in the priority change reason 516 parameter of the raw event so that it can be determined at the console 30 why a particular raw event was assigned a reduced priority. In one exemplary embodiment, the reason for changing priority status of a raw event can comprise a text string.

In step 1135, each raw event is compared to frequency-adjustable event types stored in a list in the context database 630. Similar to the vulnerability-adjustable event types discussed above, the frequency-adjustable event types can comprise those raw event types for which a high historical event frequency between a given pair of machines is seen as a reliable indicator of non-maliciousness for the network or computer being monitored by the fusion engine 22. Alternatively, also similar to the vulnerability-adjustable event types discussed above, in another exemplary embodiment (not shown) the context database 630 could instead comprise a list that identifies those raw event types for which a high historical event frequency between a given pair of machines for a network or computer being monitored by the fusion engine 22 is not seen as a reliable indicator of non-maliciousness, and historical event frequency can then be considered a trustworthy indicator of non-maliciousness for all other event types. In such a scenario, the list would identify those raw events where it is undesirable to adjust the priority status thereof based on historical event frequency. Alternatively, in yet another exemplary embodiment (not shown), the context database 630 could also comprise both types of lists where one list would identify those raw event types for which frequency-based priority adjustment is allowed and the other would identify those raw event types for which frequency-based priority adjustment is not allowed. In this case a conflict resolution rule must also be established, so that if a particular event type appears in both lists, it is well-defined which entry will take precedence. Those skilled in the art will appreciate that other configurations of lists are not beyond the scope of the present invention.

Following step 1135, in decision step 1145, it is determined whether a match exists with the stored frequency-adjustable event types. If the inquiry to decision step 1145 is negative, then the "no" branch is followed to step 1210 of FIG. 12. If the inquiry to decision step 1145 is positive, then the "yes" branch is followed to decision step 1150.

In decision step 1150, it is determined whether historical frequency information exists for the current raw event being evaluated. This determination is made based on the historical frequency value 506 of the raw event previously established by step 1015 of procedure 730 described in FIG. 10. In other words, some raw events may be of a type, source, and destination that was not seen in the historical data analyzed to produce the historical frequency information. If the inquiry to decision step 1150 is negative, then the "no" branch is followed to step 1210 of FIG. 12. If the inquiry to decision step 1150 is positive, then the "yes" branch is followed to decision step 1155.

In decision step 1155, it is determined whether the historical frequency for the current raw event being evaluated is greater than a frequent event threshold. In other words, in this decision step, it is determined whether a raw event is of a type that occurs frequently enough between a specific source and destination that it can be considered to be likely to be a non-malicious event. The frequent event threshold may be a value that corresponds to an average number of events per unit time, such as per day. However, other mathematically related forms of this value, such as the average time between events, could also be used and are not beyond the scope of the present invention. If the current raw event being processed has an historical event frequency that is greater than the threshold, then it is considered to be a frequent event and likely to be non-malicious.

If it is determined to be a frequent raw event, then its priority status can be lowered. However, if the current raw event being processed has been seen less frequently on the network, then it is not considered to be a frequent raw event and an adjustment to its priority status based on historical event frequency is considered undesirable. Therefore, if the inquiry to decision step 1155 is negative (meaning that events like the current raw event being processed have not been seen frequently on the network monitored by the fusion engine 22), then the "no" branch is followed to step 1210 of FIG. 12. If the inquiry to decision step 1155 is positive (meaning that events like the current raw event being processed have been seen frequently on the network monitored by the fusion engine 22), then the "yes" branch is followed to decision step 1160.

In decision step 1160, it is determined whether the raw event being processed is at its lowest priority status. If the inquiry to decision step 1160 is positive, then the "yes" branch is followed to step 1210, FIG. 12. If the inquiry to decision step 1160 is negative, then the "no" branch is followed to step 1165, in which the priority of the current raw event is reduced and the reason for changing the status of the priority of the current raw event is recorded. The reason is typically recorded as being that the raw event being evaluated occurs frequently.

The process then continues to FIG. 12. FIG. 12 illustrates a second portion of the computer-implemented process for routine 735 of FIG. 7, in which the CoBRA processor 625 adjusts the priority status or leaves an original priority status intact based upon the CoBRA assigned context parameters or detector-assigned type parameters of the raw event.

In step 1210, the raw event is compared to zone-adjustable event types stored in a list of the context database 630. Similar the vulnerability-adjustable event types and frequency-adjustable event types discussed above, the zone-adjustable event types are raw event types that may be defined by a network security administrator that are deemed to present low risk to the network or computer being monitored by the fusion engine 22 if they occur internally (that is, if both the source Internet protocol address and destination Internet protocol address in the raw event are located in networks defined in the context database 630 as belonging to the internal zone). However, in an alternative embodiment (not shown), the context database 630 may instead comprise a list that identifies raw event types that cannot be deemed to present low risk to the network or computer being monitored by the fusion engine 22 based solely on the zone(s) in which the source and destination are located.

In such an embodiment, event types other than those listed are deemed to present low risk to the monitored computer or network if they occur internally. In a further alternative embodiment (not shown), the context database 630 may also comprise both types of list: one list identifying raw event types that cannot be deemed to present low risk based solely on the source and destination zones, where the priority status thereof should not be adjusted, and a second list of raw events that are deemed to present low risk when seen internally, and where priority status should be adjusted such that these events will have a lower priority status. In this case a conflict resolution rule must also be established, so that if a particular event type appears in both lists, it is well-defined which entry will take precedence.

In decision step 1215, it is determined whether a match exists with the stored zone-adjustable event types in the context database 630. If the inquiry to decision step 1215 is negative, then the "no" branch is followed back to routine 740 of FIG. 7. If the inquiry to decision step 1215 is positive, then the "yes" branch is followed to decision step 1220.

In decision step 1220, it is determined whether the source zone and destination zone of the current raw event being processed are both internal relative to the network or computer being monitored by the fusion engine 22. This determination is made by examining the values of the source zone parameter 508 and destination zone parameter 510 of the raw event assigned by steps 1020 and 1025, respectively, of routine 730 shown in FIG. 10. For many event types, raw events classified as being internal are less of a threat to a network of computers being monitored compared to an event that may be external to a network or computer being monitored by the fusion engine 22.

Therefore, for internal events, it may be desirable to lower the priority status of such raw events. Conversely for raw events for which either the source or destination Internet protocol address is either in the DMZ zone or not in any defined zone (and therefore considered external), it may be desirable to keep the priority status of a raw event that was assigned to it by the detectors in the intrusion detection system. If the inquiry to decision step 1220 is negative, then the "no" branch is followed back to routine 740 if FIG. 7. If the inquiry to decision step 1220 is positive, then the "yes" branch is followed to decision step 1225.

In decision step 1225, it is determined whether the current raw event is at its lowest priority status. If the inquiry to decision step 1225 is positive, then the "yes' branch is followed back to routine 740, FIG. 7. If the inquiry to decision step 1225 is negative, then the "no" branch is followed to step 1230, in which the priority status of the current raw event is reduced and the reason for change in the priority status of the raw event is recorded. Typically, the reason in step 1230 will indicate that the priority status of the current raw event was lowered because it comprises an internal attack. The process then returns to routine 740 of FIG. 7.

The present invention is also not limited to the technique of reducing priority status values. In other words, the present invention can also comprise a scale where values are increased in order to reflect either reduced priority or increased priority. Those skilled in the art will appreciate that any number of risk adjustment schemes can be utilized and not depart from the scope and spirit of the present invention.

Referring now to FIG. 13, this Figure illustrates the computer-implemented process for routine 740 of FIG. 7 in which raw events are associated with predetermined correlation rules based upon the event type parameter 555. In this routine, the classifier 615 may identify one or more correlation rules 620 that should process each given raw event. Step 1310 is the first step of routine 740, in which all lists containing the raw events are updated to reflect any CoBRA processing changes. In other words, all objects in the exemplary object-oriented architecture containing the raw events that were adjusted by the CoBRA processor 625 are updated to reflect any adjustments in priority status.

Next, in step 1315, the raw events are forwarded to the correlation rules that apply to the raw event type parameter 555. More specifically, in step 1315, the definition of each correlation rule 620 includes a list of the raw event categories that are of interest to it. The raw event types included in each raw event category are defined in the raw event classification database 635. Therefore, the list of raw event types of interest to a correlation rule 620 is the union of the category-specific lists of raw event types for the categories of interest to the rule, where each category-specific list of raw event types is defined by the raw event classification database 635. The category-specific lists of raw event types are stored in the classifier 615, which is initialized based on the contents of the raw event classification database 635.

When the controller 655 loads a correlation rule 620 during system initialization, it associates the rule with all the event types included in the event categories of interest to the rule (determined as described in the previous paragraph) by adding the rule to a list of interested rules maintained within each such event type. Thus, after initialization, each event type includes a list of all of the correlation rules 620 that are interested in events of its type. As each raw event is received, the event reader 600 determines which correlation rules 620 should process it by retrieving the raw event's event type and then retrieving the event type's list of interested rules. Having determined the set of correlation rules 620 that should process the raw event, the process then returns to step 745 of FIG. 7.

Referring now to FIG. 14, this Figure illustrates the computer-implemented process for routine 770 of FIG. 7, which determines if a currently immature correlation event to which the current processed raw event has been added meets or satisfies the maturity criteria of a corresponding rule 620. The process described here is for an exemplary event type, Attack From Attacked Host (AFAH), rather than being generic. However, given this processing description and the descriptions of exemplary correlation event types presented earlier, it should be apparent to those skilled in the art how similar processing could be used to recognize the occurrence of each of the described exemplary event types. As noted above, each rule 620 may be implemented as a rule object in an object-oriented computer architecture. As should be clear to those skilled in the art from the previously described processing of step 1315 of FIG. 13, a single raw event may be processed by multiple correlation rule objects.

Though not depicted in FIG. 7 or FIG. 14, the processing of steps 745 through 780 of FIG. 7 (including the routine 770 processing described in FIG. 14) can be performed twice for the current processed raw event in the case of the exemplary AFAH correlation event. In one exemplary embodiment, the raw event is processed once to consider it as an inbound attack only if the raw event is an integrity attack, and is always processed to consider it as an outbound attack. When the raw event is considered as an inbound attack by steps 745 through 780, step 745 uses the raw event's destination Internet protocol address as the lookup key when attempting to retrieve a corresponding AFAH correlation event from the correlation event cache 665 (as described earlier in the discussion of step 745 processing).

When the raw event is considered as an outbound attack by steps 745 through 780, step 745 uses the raw event's source Internet protocol address as the lookup key when attempting to retrieve a corresponding AFAH correlation event from the correlation event cache 665 (as also described earlier in the discussion of step 745 processing). This "double processing" of the raw event is a unique aspect of the exemplary AFAH correlation event relative to other correlation events that can be processed by the fusion engine 22. For all of the other exemplary correlation event types described earlier, the processing of steps 745 through 780 is performed once, as should be apparent to those skilled in the art based on the descriptions of the exemplary correlation event types.

Referring again to FIG. 14, step 1410 is the first step of routine 770, in which the event type object of the classifier 615 for the current raw event being processed is added to the raw event tracking index 645. Also, the correlation event object corresponding to the current raw event object being processed is either added to the memory management list 640 (if it is a new correlation event that was just created in step 750 of FIG. 7), or is moved to a new position in the memory management list if the timestamp of the current raw event has the most recent timestamp of all the raw events associated with the current correlation event.

In addition, the current correlation event object is added to the raw event tracking index 645 in association with the raw event. The event type object and correlation event object are added to the raw event tracking index 645 so that they can later be informed by the memory management processing if the raw event is erased from memory, so they can erase their own references to the raw event. The current correlation event is also added to the memory management list 640 so that when memory resources run low, the oldest events (some of which may be immature correlation events) can be deleted from the fusion engine 22.

In decision step 1415, it is determined whether the raw event is being considered as an inbound attack. This step distinguishes whether the current AFAH correlation event includes the current raw event as an inbound or outbound attack. If the inquiry to decision step 1415 is negative, then the raw event is being considered as an outbound attack and the "no" branch is followed to step 1425. If the inquiry to decision step 1415 is positive, then the raw event being considered is an inbound attack and the "yes" branch is followed to step 1420.

In decision step 1420, it is determined whether the raw event being considered as an inbound attack is an integrity attack and occurs earlier than at least one event in the outbound attacks list of the current correlation event. The raw event being processed is known to be an integrity attack since it was added to the inbound attack list of the correlation event during the processing of step As indicated in the description of the Attack From Attacked Host event included in the earlier list of exemplary correlation event types, the AFAH event can be generated when an Integrity attack is seen against a host followed by a Confidentiality, Integrity, or Availability attack originating from that host. As indicated in the discussion of FIG. 13, when the controller 655 loads a correlation rule 620 during system initialization, it associates the rule with all of the event types included in the event categories of interest to the rule.

In the case of the AFAH rule, the event categories of interest are Confidentiality, Integrity, and Availability attacks. The AFAH rule is therefore associated with all event types defined by the raw event classification database 635 as belonging to one of these three categories. Therefore, any raw event whose event type belongs to one of these three categories can be forwarded to routine 770 for processing. Since the definition of the AFAH event requires inbound attacks to be Integrity attacks, and some of the raw events forwarded to routine 770 can instead be Confidentiality or Availability attacks, the present decision step 1420 must verify that the raw event being considered as an inbound attack is an Integrity attack.

A further consideration results from the fact that the fusion engine 22 can receive raw events generated by multiple detectors, leading to the possibility that raw events can be received in non-chronological order (that is, a raw event with a later timestamp can be received before a raw event with an earlier timestamp). For this reason, routine 770 cannot assume that raw events will be received in chronological order, and the present decision step 1420 therefore determines whether the current raw event occurs earlier than at least one event in the outbound attacks list of the current correlation event. If the inquiry to decision step 1420 is negative, then the current correlation event is deemed not mature and the "no" branch is followed back to routine 785 of FIG. 7. If the inquiry to decision step 1420 is positive, then the current correlation event is deemed mature and the "yes" branch is followed to step 1427.

In decision step 1425, it is determined whether the raw event being considered as an outbound attack occurs later than at least one event in the inbound attacks list of the current correlation event. Unlike decision step 1420, it is not necessary to determine whether the current raw event belongs to a particular category because (as described in the discussion of step 1420) every raw event forwarded to routine 770 will be either a Confidentiality, Integrity, or Availability attack and will therefore meet the criteria for inclusion as an outbound attack in any AFAH event. If the inquiry to decision step 1425 is negative, then the current correlation event is deemed not mature and the "no" branch is followed back to routine 785 of FIG. 7. If the inquiry to decision step 1425 is positive, then the current correlation event is deemed mature and the "yes" branch is followed to step 1427.

In step 1427, any outbound attacks in the current correlation event that occur earlier than the earliest inbound attack of the correlation event are removed from the list of outbound attacks. This is done because the definition of the AFAH correlation event requires that each outbound attack included in a mature AFAH correlation event must be preceded by at least one inbound attack.

In step 1430, the correlation event is removed from the memory management list 640 so that the correlation event will not be subject to being erased by the memory management mechanisms. In this way, the correlation event that is removed will not be deleted from the fusion engine 22 since the correlation event is now deemed to be mature.

In step 1435, the update time of the correlation event can be set to the most recent raw event's time stamp if the event source being read by the event reader 600 is either the event database 26 or the event log file 610, in which case the fusion engine 22 is operating in a batch mode. Alternatively, the update time of the correlation event can be set to the current time of the system on which the fusion engine 22 is executing if the event source being read by the event reader 600 is the event collector 24, in which case the fusion engine 22 is operating in a real-time mode.

In step 1440, the correlation event is added to the mature event correlation list 650. In step 1445, the correlation event containing the two or more raw events is indicated as being mature by setting an internal parameter of the correlation event. The process then returns to step 775 of FIG. 7. In one exemplary embodiment (not shown), each correlation event may be assigned a priority status, similar to the priority status parameter 555 of raw events.

Exemplary Rule Processing for Raw Event II Illustrated in FIGS. 5D, 5E, 5F

The following is the processing that would be carried out by an Attack From Attacked Host correlation rule 620 for raw event II as illustrated in FIGS. 5(*d*), 5(*e*), and 5(*f*). This discussion assumes that raw events I and II are both types of Integrity attacks and therefore qualify as inbound attacks according to the definition of the AFAH event, that raw event I occurs before raw event II, and that raw event II occurs before raw event III.

Referring back to FIG. 7, in step 745, when raw event II is being considered as an inbound attack, its destination internet protocol address (3.3.3.3) would be used as a lookup key to retrieve an AFAH correlation event from the correlation event cache 665. Assuming that in this case raw events are received in chronological order and therefore raw event III has not yet been processed by the fusion engine, there would be no AFAH correlation event indexed by the attacked internet protocol address 3.3.3.3, and therefore the "no" branch of decision step 745 would be taken and correlation event 513 would be created in step 750. In step 755, correlation event 513 would be stored in the correlation event cache 665. In step 760, raw event II would be associated with correlation event 513 by storing a reference to it in the inbound attacks list of correlation event 513. In step 765 it would be determined that correlation event 513 is not already mature, so the "no" branch would be followed to step 770.

Referring now to FIG. 14, in decision step 1415 the "yes" branch would be followed since raw event II is being considered as an inbound attack. In decision step 1420, the "no" branch would be followed since there are no raw events in the outbound attacks list of the newly created correlation event 513. To summarize this processing, when considered as an inbound event, raw event II is added to a newly created but still immature correlation event 513.

Referring back to FIG. 7, in step 745, when raw event II is being considered as an outbound attack, its source internet protocol address (2.2.2.2) would be used as a lookup key to retrieve an AFAH correlation event from the correlation event cache 665. Assuming that in this case raw events are received in chronological order and therefore raw event I has already been processed by the fusion engine, AFAH correlation event 511 would already be present in the correlation event cache 665 indexed by the attacked interne protocol address 2.2.2.2, and therefore the "yes" branch of decision step 745 would be taken to step 760. In step 760, raw event II would be associated with correlation event 511 by storing a reference to it in the outbound attacks list of correlation event 511. In step 765 it would be determined that correlation event 511 is not already mature, so the "no" branch would be followed to step 770.

Referring now to FIG. 14, in decision step 1415 the "no" branch would be followed since raw event II is being considered as an outbound attack. In decision step 1425, the "yes" branch would be followed since the inbound attacks list of correlation event 511 already contains raw event I, and the timestamp of raw event II is later than that of raw event I. At this point, correlation event 511 has been determined to be mature and steps 1427 through 1445 would be followed to process the newly-mature correlation event 511. To summarize this processing, when considered as an outbound attack, raw event II is added to existing correlation event 511 which becomes mature as a result.

To perform decision step 1425 in the above-described exemplary rule processing, the respective time stamps of the first-generated raw event I and the second-generated raw event II are compared. However, it is noted that since the raw events could originate from different detectors, there could be some variance in the time stamps provided for each raw event. That is, while the second-generated raw event II may occur after the first-generated raw event I, because of possible variances in the internal clocks of the detectors generating the raw events, it is foreseeable that the first-generated raw event I may have a later time stamp than the second-generated raw event II.

In other words, the internal clocks between respective detectors in neighboring intrusion detection systems may not be synchronized. In order to compensate for such a scenario, a tri-state comparison could be performed. That is, the fusion engine 22 and more specifically, the rules 620 may allow for the possibility that there may be some synchronization offsets so a determination can be made if a first raw event came before another raw event. More specifically, when comparing the timestamps of two raw events generated by different detectors to determine whether one of the events precedes (or follows) the other, the result of the comparison can be yes, no, or maybe. The "maybe" result occurs when the timestamps of the two events are sufficiently close that uncertainty regarding the synchronization offsets of the two detectors makes it impossible to determine which event occurred first.

The fusion engine 22 could be configured to treat the "maybe" result either as a "yes" (in one configuration) or as a "no" (in an alternative configuration). In a preferred embodiment, the fusion engine 22 treats a "maybe" as a "yes" to maximize the chance that correlation event maturity criteria will be met (so that mature correlation events will be generated whenever it appears possible that their criteria might be met). When the fusion engine 22 compares the timestamps of two events generated by the same detector, then it can ignore any synchronization effects and perform a simple binary comparison between the timestamps of the two events.

Exemplary Computer-Implemented Process to Determine if Mature Correlation Events Timed Out Referring now to FIG. 15, this Figure illustrates the computer-implemented process for routine 785 which determines whether any mature correlation events have stopped occurring. Step 1510 is the first step of routine 785 in which the current processing time is compared with the update times of the correlation events stored in the mature event list 650 (the update times of correlation events are set as described in step 1435 of FIG. 14). For the purpose of this comparison, the definition of the current processing time depends on the mode in which the fusion engine 22 is operating. If it is operating in a batch mode (that is, the event source from which events are being read is either the event database 26 or the event log file 610), then the current processing time is the timestamp of the last event that was read from the event source. Alternatively, if the fusion engine 22 is operating in real-time mode (that is, the event source from which events are being read is the event collector 24), then the current processing time is the current time of the system on which the fusion engine 22 is running.

In decision step 1515, it is determined whether the difference between the current processing time and the update time of each correlation event exceeds a predetermined threshold. In other words, it is determined whether the mature correlation events contained within the mature event list 650 have become old or stale in that no computer activity or raw events have occurred for these correlation events over some period of time. If the inquiry to decision step 1515 is positive, then the "yes" branch is followed back to step 790 of FIG. 7. If the inquiry to decision step 1515 is negative, then the "no" branch is followed back to step 795 of FIG. 7.

It should be understood that the foregoing relates only to illustrative embodiments of the present invention, and that numerous changes may be made therein without departing from the spirit and scope of the invention as defined by the following claims.

What is claimed is:

1. A method for identifying a computer attack, the method comprising the steps of:
   a computer receiving computer events from one or more data sources, each of the data sources comprising an intrusion detector that assigns a priority status to each of the computer events, each of the computer events comprising computer activity identified as a possible attack on one or more computers in a network and a priority status assigned by one of the intrusion detectors;
   the computer classifying each of the computer events by assigning event type parameters to the computer events respectively;
   the computer assigning context parameters to the computer events respectively and adjusting or leaving intact the priority status of the respective computer events based on a comparison of a respective computer event and event type parameter with information indicating conditions in the network;
   the computer identifying one or more relationships between two or more computer events by using rules associated with the event type parameters to determine if the two or more computer events are part of a coordinated computer attack;
   in response to identifying one or more relationships between the two or more computer events, the computer generating an event message indicating that a correlation event comprising the two or more computer events has occurred; and
   the computer displaying one or more event messages that describe relationships between computer events.

2. The method of claim 1, wherein the information indicating conditions in the network comprises at least one of vulnerability information associated with one of the computers in the network, a location of one of the computers in the network, and information associated with historical event frequency.

3. The method of claim 1, further comprising the steps of:
   the computer determining if the priority status of each of the computer events should be adjusted based on the context parameters assigned to the computer events respectively.

4. The method of claim 1, wherein the step of receiving computer events from one or more data sources further comprises the step of receiving at the computer real-time computer events from one of the intrusion detector and a firewall.

5. The method of claim 1, wherein the step of receiving computer events from one or more data sources further comprises the step of receiving, at the computer, computer events from one of a file and database.

6. The method of claim 1, wherein the step of classifying the computer events further comprises the steps of:
   the computer identifying an event type parameter for each of the computer events;
   the computer comparing each of the event type parameters with an event type category of a list; and
   the computer assigning each of the computer events to a corresponding event type category in the list.

7. The method of claim 1, wherein the step of identifying relationships between two or more computer events comprises the steps of:
   the computer associating each of the computer events with one or more correlation rules that correspond with a type parameter of the computer event;
   the computer applying each correlation rule to its associated group of computer events; and
   the computer determining if a computer attack or security breach has occurred based upon successful application of a correlation rule.

8. The method of claim 1, wherein adjusting or leaving intact the priority status of the respective computer events further comprises reducing the priority status of a respective computer event based on the priority status of the respective computer event being assigned a lowest priority by one of the intrusion detectors and in response to the respective computer event matching an existing vulnerability-adjustable event type.

9. The method of claim 1, wherein adjusting or leaving intact the priority status of the respective computer events further comprises leaving the priority status of a respective computer event intact in response to the respective computer event matching an existing vulnerability-adjustable event type, a frequency-adjustable event type, and a zone-adjustable event type.

10. The method of claim 1, wherein the step of assigning context parameters to each of the computer events further comprises the steps of:
   the computer comparing parameters of each of the computer events with information in a database; and
   the computer assigning additional parameters to each of the computer events relating to the conditions of the computer event.

11. The method of claim 10, wherein the additional parameters comprise one of a vulnerability status, a historical frequency value, a source zone value, a destination zone value, a detector zone value, and a text string.

12. A computer system for determining relationships between computer events, the computer system comprising:
   a central processing unit ("CPU"), a computer readable memory, and a computer readable tangible storage device;
   first computer program instructions to receive a plurality of computer events from one or more intrusion detectors that assign a priority parameter to each of the computer events, each of the computer events having a first set of parameters comprising computer activity identified by one of the intrusion detectors as a possible attack on one or more computers and a priority parameter assigned by one of the intrusion detectors;
   second computer program instructions to store each of the computer events in an event storage area based upon an event type parameter;
   third computer program instructions to compare each of the computer events to data contained in a context database to determine if the priority parameter of each of the computer events should be adjusted;
   fourth computer program instructions to adjust or leave the priority parameter of each of the computer events alone based on the determination;
   fifth computer program instructions to associate each of the computer events with one or more correlation events;
   sixth computer program instructions to determine if two or more computer events are part of a coordinated computer attack by applying one or more rules to each of the computer events based upon the correlation event associations; and
   seventh computer program instructions to generate an event message indicating that a correlation event has occurred in response to each successful application of each of the rules,
   wherein each of the computer program instructions are stored on the computer readable tangible storage device for execution by the CPU via the computer readable memory.

13. The computer system of claim 12, further comprising eighth computer program instructions to determine the intent of a computer attack based upon the type of event message generated.

14. The computer system of claim 12, wherein the context database comprises any one of vulnerability values, computer event frequency values, source and destination zone values, and detector zone values.

15. The computer system of claim 12, wherein the sixth computer program instructions to determine if two or more computer events are part of a coordinated computer attack comprises:
   eighth computer program instructions to apply, for each of the correlation events, a correlation rule associated with the correlation event to its associated group of computer events; and
   ninth computer program instructions to determine if a coordinated computer attack has occurred based upon successful application of a correlation rule.

16. The computer system of claim 12, further comprising eighth computer program instructions to create computer event storage areas based upon information received from a computer event classification database.

17. The computer system of claim 16, wherein the computer event classification database comprises tables that include information that categorizes computer events based on any one of the following: how an activity indicated by a computer event may impact one or more target computers, how many target computers may be affected by an activity indicated by a computer event, and how activities indicated by respective computer events gain access to one or more target computers.

18. A security management system comprising:
   a plurality of data sources comprising intrusion detectors that assign a priority parameter to computer events comprising computer activity identified as a possible attack on one or more computers in a computer network; and
   a computer system comprising a central processing unit ("CPU"), a computer readable memory, a computer readable tangible storage device, first computer program instructions to receive each of the computer events from the data sources and to store each of the received computer events in the computer readable tangible storage device, second computer program instructions to adjust or leave intact the priority parameter of each of the computer events based on a comparison of each of the computer events with information indicating conditions in the network, and third computer program instructions to identify relationships between two or more computer events generated by the data sources using rules associated with event type parameters assigned to each of the computer events to determine if the two or more computer events are part of a coordinated computer attack,
   wherein the computer program instructions are stored on the computer readable tangible storage device for execution by the CPU via the computer readable memory.

19. The system of claim 18, further comprising a console communicably coupled to the computer system to display output relating to the identified relationships between the two or more computer events.

20. The system of claim 18, wherein the computer system adjusts the priority parameter of one of the received computer events if one or more conditions are satisfied, the conditions comprising the one received computer event matching a vulnerability-adjustable event stored in a context database at the computer system, the one received computer event comprising a historical event frequency greater than a threshold, and the one received computer event comprising a source zone and a destination zone located in a network defined in the context database.

21. The system of claim 18, wherein the second computer program instructions comprises:
   third computer program instructions to associate each of the computer events with one or more correlation rules that correspond with a type parameter of the computer event;
   fourth computer program instructions to apply each correlation rule to its associated group of computer events; and fifth computer program instructions to determine if a coordinated computer attack has occurred based upon successful application of a correlation rule.

22. A computer program product for identifying a computer attack, the computer program product comprising:
a computer readable tangible storage device and computer readable program code stored on the computer-readable tangible storage device, the computer readable program code comprising:
computer readable program code to receive computer events from one or more data sources, each of the data sources comprising an intrusion detector that assigns a priority status to each of the computer events, each of the computer events comprising computer activity identified as a possible attack on one or more computers in a network and a priority status assigned by one of the intrusion detectors;
computer readable program code to classify each of the computer events by assigning event type parameters to the computer events respectively;
computer readable program code to assign context parameters to the computer events respectively and adjust or leave intact the priority status of the respective computer events based on a comparison of a respective computer event and event type parameter with computer information indicating conditions in the network;
computer readable program code to identify one or more relationships between two or more computer events by using rules associated with the event type parameters to determine if the two or more computer events are part of a coordinated computer attack;
computer readable program code to generate an event message indicating that a correlation event comprising the two or more computer events has occurred in response to identifying one or more relationships between the two or more computer events; and
computer readable program code to display one or more event messages that describe relationships between computer events.

23. The computer program product of claim 22, wherein the computer readable program code to classify the computer events further comprises:
computer readable program code to identify an event type parameter for each of the computer events;
computer readable program code to compare each of the event type parameters with an event type category of a list; and
computer readable program code to assign each of the computer events to a corresponding event type category in the list.

24. The computer program product of claim 22, wherein the information indicating conditions in the network comprises at least one of vulnerability information associated with one of the computers in the network, a location of one of the computers in the network, and information associated with historical event frequency.

25. The computer program product of claim 22, wherein computer readable program code to identify one or more relationships between two or more computer events comprises:
computer readable program code to associate each of the computer events with one or more correlation rules that correspond with a type parameter of each of the computer events;
computer readable program code to apply each correlation rule to its associated group of computer events; and
computer readable program code to determine if a coordinated computer attack has occurred based upon successful application of a correlation rule.

26. The computer program product of claim 22, further comprising:
computer readable program code to determine if the priority status of each of the computer events should be adjusted based on the context parameters assigned to each of the computer events respectively.

27. The computer program product of claim 26, wherein the computer readable program code to adjust or leave intact the priority status of the respective computer events further comprises:
computer readable program code to identify a priority status parameter of each of the computer events;
computer readable program code to compare each of the computer events to information contained in a knowledge-based database;
computer readable program code to change the priority status parameter of a respective computer event if a match occurs in response to comparing each of the computer events to the information contained in the knowledge-based database; and
computer readable program code to leave the priority status intact if a match does not occur in response to comparing each of the computer events to the information contained in the knowledge-based database.

* * * * *